(12) United States Patent
Choi et al.

(10) Patent No.: US 12,176,481 B2
(45) Date of Patent: Dec. 24, 2024

(54) SOLID ION CONDUCTOR, SOLID ELECTROLYTE AND ELECTROCHEMICAL DEVICE INCLUDING THE SAME, AND METHOD OF PREPARING THE SOLID ION CONDUCTOR

(71) Applicant: SAMSUNG ELECTRONICS CO., LTD., Suwon-si (KR)

(72) Inventors: Wonsung Choi, Hwaseong-si (KR); Jusik Kim, Hwaseong-si (KR); Gabin Yoon, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 690 days.

(21) Appl. No.: 17/398,307

(22) Filed: Aug. 10, 2021

(65) Prior Publication Data
US 2022/0166057 A1 May 26, 2022

(30) Foreign Application Priority Data
Nov. 24, 2020 (KR) .................. 10-2020-0159096

(51) Int. Cl.
*H01M 10/0562* (2010.01)
*H01M 4/505* (2010.01)
*H01M 4/525* (2010.01)
*H01M 4/58* (2010.01)
*H01M 4/583* (2010.01)

(52) U.S. Cl.
CPC ....... *H01M 10/0562* (2013.01); *H01M 4/505* (2013.01); *H01M 4/525* (2013.01); *H01M 4/5815* (2013.01); *H01M 4/5825* (2013.01); *H01M 4/583* (2013.01); *H01M 2300/008* (2013.01)

(58) Field of Classification Search
CPC .. H01M 10/0562; H01M 4/505; H01M 4/525; H01M 4/5815; H01M 4/5825; H01M 4/583; H01M 2300/008
See application file for complete search history.

(56) References Cited

U.S. PATENT DOCUMENTS

| 2017/0040637 | A1 | 2/2017 | Ceder et al. |
| 2019/0088995 | A1* | 3/2019 | Asano ................. H01M 10/052 |
| 2019/0305313 | A1* | 10/2019 | Kim ...................... H01M 4/608 |

FOREIGN PATENT DOCUMENTS

| CN | 105254184 A | 1/2016 |
| CN | 109950617 A | 6/2019 |

(Continued)

OTHER PUBLICATIONS

JP2006244734A translation (Year: 2006).*

(Continued)

*Primary Examiner* — Jane J Rhee
(74) *Attorney, Agent, or Firm* — CANTOR COLBURN LLP

(57) ABSTRACT

A solid ion conductor, a solid electrolyte and an electrochemical device each including the same, and a method of preparing the solid ion conductor are disclosed. The solid ion conductor may include a compound represented by Formula 1:

$$\text{Li}_a\text{M}_b\text{In}_c\text{X}_d \qquad \text{Formula 1}$$

In Formula 1, M is at least one of a metal having an oxidation state of +1, or a metal having an oxidation state of +3, X is at least one halogen, $2.5 < a < 3.5$, $0 < b < 0.5$, $0.5 < c < 1.5$, and $5 < d < 7$.

31 Claims, 7 Drawing Sheets

(56) References Cited

FOREIGN PATENT DOCUMENTS

| CN | 110854428 A | | 2/2020 |
|---|---|---|---|
| CN | 111129429 A | | 5/2020 |
| JP | 2006244734 A | * | 9/2006 |
| JP | 5108205 B2 | | 10/2012 |
| KR | 1020170016807 A | | 2/2017 |

OTHER PUBLICATIONS

James A. Dawson et al, "Composition Screening of Lithium- and Sodium-Rich Anti-Perovskites for Fast-Conducting Solid Electrolytes", J. Phys. Chem. C., (2018) vol. 122, pp. 23978-23984.

Li, X. et al, "Air-stable Li 3 InCl 6 electrolyte with high voltage compatibility for all-solid-state batteries", Energy Environ. Sci. 12, 2665-2671 (2019).

Wang, S. et al, "Lithium Chlorides and Bromides as Promising Solid-State Chemistries for Fast Ion Conductors with Good Electrochemical Stability", Angew. Chem 131, 8123?8127 (2019).

Xiaona Li et al, "Origin of Superionic $Li_3Y_{1-x}In_xCl_6$ Halide Solid Electrolytes with High Humidity Tolerance", Nano Lett., (2020) vol. 20(6) pp. 4384-4392.

Yasumasa Tomita et al, "Li ion conductivity of solid electrolyte, $Li_{3\_2x}M_xInBr_6$ (M=Mg, Ca, Sr, Ba)", Solid State Ionics 174(2004):35-39, (2004).

* cited by examiner

SOLID ION CONDUCTOR, SOLID ELECTROLYTE AND ELECTROCHEMICAL DEVICE INCLUDING THE SAME, AND METHOD OF PREPARING THE SOLID ION CONDUCTOR

CROSS-REFERENCE TO RELATED APPLICATION

This application claims priority to Korean Patent Application No. 10-2020-0159096, filed on Nov. 24, 2020, in the Korean Intellectual Property Office, and all the benefits accruing therefrom under 35 U.S.C. § 119, the content of which is incorporated herein by reference in its entirety.

BACKGROUND

1. Field

The present disclosure relates to solid ion conductors, solid electrolytes and electrochemical device each including the same, and methods of preparing the solid ion conductors.

2. Description of the Related Art

Electrochemical devices, for example, all-solid secondary batteries, include lithium metal or the like having high energy density in a negative electrode to achieve high energy density and use a solid ion conductor as an electrolyte for safe operation.

As the solid ion conductor, extensive research has been conducted on oxide-based solid ion conductors and sulfide-based solid ion conductors. Although the oxide-based solid ion conductors have excellent chemical stability, ionic conductivity and moldability thereof are poorer than those of the sulfide-based solid ion conductors. The sulfide-based solid ion conductors have high ionic conductivity and excellent moldability, but undesirable gas can be generated as a result of reaction with water.

Therefore, there is a need to develop solid ion conductors having increased ionic conductivity, excellent electrochemical stability in a wide voltage window, and improved charging and discharging characteristics, solid electrolytes and electrochemical devices each including the same, and methods of preparing the solid ion conductors.

SUMMARY

Provided is a solid ion conductor having increased ionic conductivity, electrochemical stability in a wide voltage window, and improved charging and discharging characteristics.

Provided is a solid electrolyte including the solid ion conductor.

Provided are electrochemical devices including the solid ion conductor.

Provided are methods of preparing the solid ion conductor.

Additional aspects will be set forth in part in the description which follows and, in part, will be apparent from the description, or may be learned by practice of the presented embodiments of the disclosure.

According to an aspect of an embodiment, a solid ion conductor includes a compound represented by Formula 1:

$$Li_aM_bIn_cX_d, \quad \text{Formula 1}$$

wherein in Formula 1,

M is at least one of a metal having an oxidation state of +1, or a metal having an oxidation state of +3, X is at least one halogen, 2.5<a<3.5, 0<b<0.5, 0.5<c<1.5, and 5<d<7.

The compound may include a compound represented by Formula 2:

$$Li_{x-y}(M1)_yIn_{1-z}(M2)_zX'_w, \quad \text{Formula 2}$$

In Formula 2,

M1 may be a metal having an oxidation state of +1 and an ionic radius of 76 picometers or more, M2 may be a metal having an oxidation state of +3, X' may be at least one halogen, 3<x<4, 0<y<0.5, 0<z<0.5, 5<w<7, and 2.5<x-y<3.5.

The compound may have a distorted rock-salt type structure.

The compound may have a crystal structure having an x-axis, a y-axis, and a z-axis, and the crystal structure includes a lithium-ion migration channel extending in the x-axis direction, the y-axis direction, and the z-axis direction.

The compound may include a crystal structure belonging to a C2/m space group or a C2/m-like space group.

The compound may have a peak at a diffraction angle of 51.5°2θ to 52.0°2θ that is shifted to a smaller angle than a corresponding peak of $Li_3InCl_6$, when analyzed by X-ray diffraction using CuKα radiation.

The solid ion conductor may have an ionic conductivity of about $3.5\times10^{-4}$ millisiemens per centimeter or greater at 25° C.

According to an aspect of another embodiment, a solid electrolyte includes the solid ion conductor, and optionally at least one of an oxide solid electrolyte, or a sulfide solid electrolyte.

The solid electrolyte may be electrochemically stable between 0.6 volt and 4.2 volts versus $Li/Li^+$.

According to another aspect of an embodiment, an electrochemical device includes a positive electrode layer; a negative electrode layer; and a solid electrolyte layer disposed between the positive electrode layer and the negative electrode layer, wherein at least one of the positive electrode layer, the negative electrode layer, or the solid electrolyte layer includes the above-described solid electrolyte.

The electrochemical device may further include a protective film, wherein the protective film is on at least one of the positive electrode layer, or the negative electrode layer, and the protective film includes the solid electrolyte.

The solid electrolyte layer may include the solid ion conductor.

The positive electrode layer may include a positive active material including at least one of a lithium transition metal oxide, a lithium transition metal phosphate, or a sulfide; and the solid ion conductor.

The solid ion conductor may include a lithium-ion transfer path including a metal ion having an oxidation state of +1. The metal ion may be inserted into the lithium-ion transfer path during charge and discharge of the positive active material.

The positive electrode layer may further include an ion-conductive inorganic material.

The negative electrode layer may include at least one of a metallic negative active material, or a carbonaceous negative active material.

The electrochemical device may be an all-solid secondary battery or a metal air battery.

According to another aspect of an embodiment, a method of preparing a solid ion conductor includes:

providing a solid ion conductor-forming precursor mixture;

mechanically milling the solid ion conductor-forming precursor mixture; and heat-treating the solid ion conductor-forming precursor mixture at a temperature above 40° C. and below 300° C. to prepare the solid ion conductor including a compound represented by Formula 1:

$$Li_aM_bIn_cX_d.$$  Formula 1

In Formula 1,

M is at least one of a metal having an oxidation state of +1, or a metal having an oxidation state of +3, X is at least one halogen, $2.5 < a < 3.5$, $0 < b < 0.5$, $0.5 < c < 1.5$, and $5 < d < 7$.

Also disclosed is a protected positive electrode layer, including: a positive electrode layer; and a protective film comprising the solid ion conductor on the positive electrode layer.

Also disclosed is a protected negative electrode layer, including a negative electrode layer; and a protective film comprising the solid ion conductor on the negative electrode layer.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
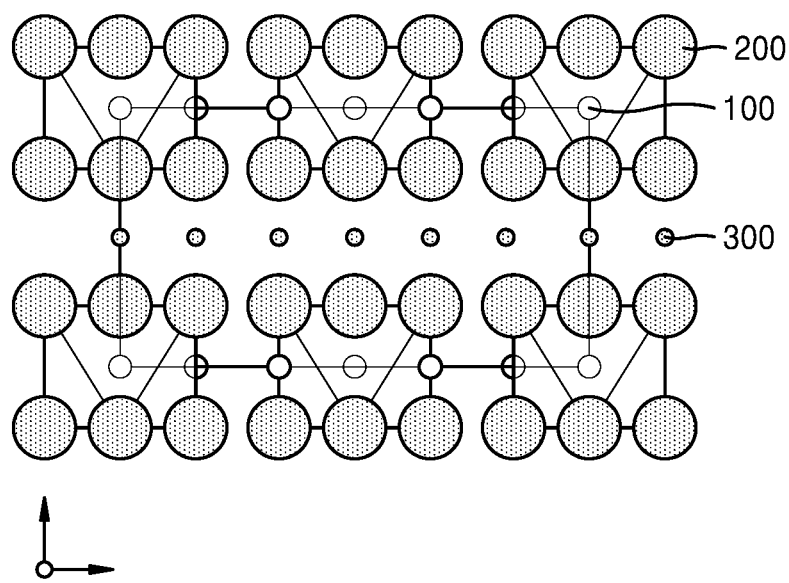
FIG. 1 is a schematic diagram illustrating an embodiment of a crystal structure of a solid ion conductor compound.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain various aspects. As used herein, the term "and/or" includes any and all combinations of one or more of the associated listed items.

It will be understood that when an element is referred to as being "on" another element, it can be directly on the other element or intervening elements may be present therebetween. In contrast, when an element is referred to as being "directly on" another element, there are no intervening elements present.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a solid ion conductor, a solid electrolyte and an electrochemical device each including the same, and a method of preparing the solid ion conductor according to an embodiment of the present disclosure will be described in detail with reference to the accompanying drawings. Accordingly, it should be apparent to those skilled in the art that the following description of various embodiments of the present disclosure is provided for illustration purpose only and not for the purpose of limiting the present disclosure as defined by the appended claims and their equivalents.

Expressions such as "at least one of" or "one or more", when preceding a list of elements, modify the entire list of elements and do not modify the individual elements of the list. As used herein, the term "combination" includes a mixture, an alloy, a reaction product, and the like unless otherwise stated.

Throughout the specification, the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof, unless otherwise stated.

As used herein, terms "first", "second", and the like are used to distinguish one component from another, without indicating order, quantity, or importance. An expression used in the singular encompasses the expression of the plural, unless otherwise indicated or it has a clearly different meaning in the context. The term "or" refers to "and/or" unless otherwise stated.

As used herein, the terms "an embodiment", "embodiments", and the like indicate that elements described with regard to an embodiment are included in at least one embodiment described in this specification and may or may not present in other embodiments. In addition, it may be understood that the described elements are combined in any suitable manner in various embodiments.

Unless otherwise defined, all terms (including technical and scientific terms) used herein have the same meaning as commonly understood by one or ordinary skill in the art to which this application belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

All patents, patent applications, and other cited references are incorporated herein by reference in their entirety. However, in the event of any conflict or inconsistency between terms used herein and terms of the cited references, the terms used in this specification take precedence over the terms of the cited references. While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modification, variations, improvements, and substantial equivalents.

Solid ion conductors have been used as solid electrolytes. Solid electrolytes often do not have higher ionic conductivity than liquid electrolytes. Therefore, when solid electrolytes are used in an electrochemical device, the electrochemical device may have poor charging and discharging characteristics, in particular at room temperature.

Among the solid ion conductors, extensive research has been conducted on sulfide-based solid ion conductors and oxide-based solid ion conductors. Although sulfide-based solid ion conductors have high ionic conductivity, their chemical stability and electrochemical stability may deteriorate due to gas generation. Although oxide-based solid ion conductors have excellent chemical stability, poor moldability and low ionic conductivity thereof may impair charging and discharging characteristics when the oxide-based solid ion conductors are used in electrochemical devices. Thus, a process of crystallizing the oxide-based solid ion conductors at a high temperature above 1000° C. is often needed to compensate for the disadvantages.

Recently, research into halide-based solid electrolytes as solid ion conductors has been conducted. Halide-based solid electrolytes may be molded by pressurizing without generating gas. As a halide-based solid electrolyte, $Li_3InCl_6$ has been widely used as a solid electrolyte of a positive electrode. However, when $Li_3InCl_6$ is used in electrochemical devices as a solid electrolyte, ionic conductivity is still low resulting in deterioration of charging and discharging characteristics.

To compensate for the limitations, the present inventors have suggested a solid ion conductor, a solid electrolyte and an electrochemical device each including the same, and a method of preparing the solid ion conductor.

Hereinafter, a solid ion conductor, a solid electrolyte and an electrochemical device each including the same, and a method of preparing the solid ion conductor will be described in detail.

Solid Ion Conductor

A solid ion conductor according to an embodiment may include a compound represented by Formula 1 below:

$$Li_aM_bIn_cX_d.$$  Formula 1

In Formula 1,

M is at least one of a metal having an oxidation state of +1, or a metal having an oxidation state of +3, X is at least one halogen, $2.5 < a < 3.5$, $0 < b < 0.5$, $0.5 < c < 1.5$, and $5 < d < 7$.

The compound represented by Formula 1 may include a compound represented by Formula 2 below:

$$Li_{x-y}(M1)_yIn_{1-z}(M2)_zX'_w.$$  Formula 2

In Formula 2,

M1 may be a metal having an oxidation state of +1 and an ionic radius of 76 picometers (pm) or more, M2 may be a metal having an oxidation state of +3, X' may be at least one halogen, $3 < x < 4$, $0 < y < 0.5$, $0 < z < 0.5$, $5 < w < 7$, and $2.5 < x-y < 3.5$.

The compound may be a halide-based solid ion conductor in which Li site and/or In site is substituted with a metal having an oxidation state of +1 and/or a metal having an oxidation state of +3. The halide-based solid ion conductor may have increased ionic conductivity compared to a $Li_3InCl_6$ halide-based solid ion conductor. When the solid ion conductor is used in an electrochemical device, the electrochemical device may have electrochemical stability in a wide voltage window and improved charging and discharging characteristics.

The reason why the compound is understood to have increased ionic conductivity compared to the $Li_3InCl_6$ halide-based solid ion conductor will be described below in more detail, but this is made only for illustrative purposes and the scope of the present disclosure is not limited to the following descriptions.

FIG. 1 is a schematic diagram illustrating an embodiment of a crystal structure of a solid ion conductor compound. As shown in FIG. 1, a solid ion conductor compound according to an embodiment has a distorted rock-salt type crystal structure. A rock-salt-type crystal structure is a type of ionic crystal structure in which the cations have a face-centered cubic arrangement, with anions occupying all the octahedral holes. It can also be described as a fcc array of anions with cations in the octahedral holes. In a distorted rock-salt-type crystal structure, one or more atoms depart from their positions in an ideal rock-salt-type crystal structure. The compound is formed of octahedra ($InCl_6^{3-}$) in which an $In^{3+}$ metal 100 is a central element coordinated by 6 $Cl^-$ 200, and some of the $In^{3+}$ are substituted with a metal (M or M2) other than In having an oxidation state of +3. The compound has a layered crystal structure in which $Li^+$ 300 is located around the $InCl_6^{3-}$ octahedra, and some of the $Li^+$ is substituted with metal elements (M or M1) other than lithium having an oxidation state of +1. $Li^+$ metal located around the $InCl_6^{3-}$ octahedron may be substituted with a metal (M or M1) other than lithium having an oxidation state of +1, for example, a metal having an oxidation state of +1 (M or M1) and an ionic radius of 76 pm or greater. The ionic radius is a measure of the size of the atom's ion. Ionic radii can be found in "Revised Effective Ionic Radii and Systematic Studies of Interatomic Distances in Halides and Chalcogenides", *Acta Cryst.* A32 751-767 (1976). $Li^+$ may be linked to $Cl^-$ via an ionic bond, e.g., to provide LiCl according to a distance to $Cl^-$. While not wanting to be bound by theory, it is understood that because the $Li^+$ site is substituted with a cation of a metal (M or M1) having a greater ion radius than a $Li^+$ ion, a space in which $Li^+$ ions freely migrate may be formed. The compound may have a crystal structure having an x-axis, a y-axis, and a z-axis, and the crystal structure comprises a lithium-ion migration channel extending in the x-axis direction, the y-axis direction, and the z-axis direction. As a result, it is understood that lithium-ion conductivity is improved consequently. In an aspect, the compound has a crystal structure having lithium ion migration channels in three directions, the three directions correspond to directions of the unit cell axes of the crystal structure, e.g., directions of the a, b, and c unit cell axes.

The compound may include a crystal structure belonging to a C2/m space group or a C2/m-like space group. The C2/m space group refers to a space group of a crystal structure defined by ICSD No. 04-009-9027, and the C2/m-like space group is a crystal structure similar to the crystal structure of the C2/m space group and has a peak pattern similar to that of the crystal structure of the C2/m space group in an XRD spectrum. For example, the crystal structure of the C2/m space group may have diffraction peaks at diffraction angles of 28°2θ to 29°2θ, 29°2θ to 30°2θ, 32.5°2θ to 35°2θ, 37°2θ to 38.5°2θ, 42.5°2θ to 45°2θ, 47.5°2θ to 50°2θ, and 51.5°2θ to 52.0°2θ. In an aspect, the C2/m-like space group is a monoclinic space group.

In the compound, the peak shown at the diffraction angle of 51.5°2θ to 52.0°2θ obtained in an XRD spectrum using CuKα radiation may be shifted to a smaller angle than a corresponding peak of the $Li_3InCl_6$ compound. In other words, a crystal lattice size of the compound may be increased in the x-axis direction, the y-axis direction, and/or the z-axis direction when compared with the $Li_3InCl_6$ compound. A solid ion conductor including the compound may have improved ionic conductivity.

For example, M (or M1) may be at least one of Na, K, Rb, Cs, Ag, Au, Cu, Hg, Tl, Ga, Tl, Sc, Y, La, Lu, or Gd.

For example, X may be at least one of Cl, Br, or I.

For example, in Formula 1, 0<b≤0.3 may be satisfied.

For example, in Formula 1, 0.7<c<1.2 may be satisfied.

For example, the compound may include at least one of $Li_{3-p}K_pInCl_6$ (where 0<p≤0.3), $Li_{3-p}Cu_pInCl_6$ (where 0<p≤0.3), $Li_{3-p}Na_pInCl_6$ (where 0<p≤0.3), $Li_{3-p}Rb_pInCl_6$ (where 0<p≤0.3), $Li_{3-p}Cs_pInCl_6$ (where 0<p≤0.3), $Li_{3-p}Ag_pInCl_6$ (where 0<p≤0.3), $Li_{3-p}Hg_pInCl_6$ (where 0<p≤0.3), $Li_{3-p}Tl_pInCl_6$ (where 0<p≤0.3), $Li_{3-p}K_pInCl_5Br$ (where 0<p≤0.3), $Li_{3-p}Cu_pInCl_5Br$ (where 0<p≤0.3), $Li_{3-p}Na_pInCl_5Br$ (where 0<p≤0.3), $Li_{3-p}Rb_pInCl_5Br$ (where 0<p≤0.3), $Li_{3-p}Cs_pInCl_5Br$ (where 0<p≤0.3), $Li_{3-p}Ag_pInCl_5Br$ (where 0<p≤0.3), $Li_{3-p}Hg_pInCl_5Br$ (where 0<p≤0.3), $Li_{3-p}Tl_pInCl_5Br$ (where 0<p≤0.3), $Li_{3-p}K_pInClBr_5$ (where 0<p≤0.3), $Li_{3-p}Cu_pInClBr_5$ (where 0<p≤0.3), $Li_{3-p}Na_pInClBr_5$ (where 0<p≤0.3), $Li_{3-p}Rb_pInClBr_5$ (where 0<p≤0.3), $Li_{3-p}Cs_pInClBr_5$ (where 0<p≤0.3), $Li_{3-p}Ag_pInClBr_5$ (where 0<p≤0.3), $Li_{3-p}Hg_pInClBr_5$ (where 0<p≤0.3), $Li_{3-p}Tl_pInClBr_5$ (where 0<p≤0.3), $Li_{3-p}K_pIn_{1-q}Ga_qCl_6$ (where 0<p≤0.3 and 0<q≤0.3), $Li_{3-p}Cu_pIn_{1-q}Ga_qCl_6$ (where 0<p≤0.3 and 0<q≤0.3), $Li_{3-p}Na_pIn_{1-q}Ga_qCl_6$ (where 0<p≤0.3 and 0<q≤0.3), $Li_{3-p}Rb_pIn_{1-q}Ga_qCl_6$ (where 0<p≤0.3 and 0<q≤0.3), $Li_{3-p}Cs_pIn_{1-q}Ga_qCl_6$ (where 0<p≤0.3 and 0<q≤0.3), $Li_{3-p}Ag_pIn_{1-q}Ga_qCl_6$ (where 0<p≤0.3 and 0<q≤0.3), $Li_{3-p}Hg_pIn_{1-q}Ga_qCl_6$ (where 0<p≤0.3 and 0<q≤0.3), $Li_{3-p}Tl_pIn_{1-q}Ga_qCl_6$ (where 0<p≤0.3 and 0<q≤0.3), $Li_{3-p}K_pIn_{1-q}Ga_qCl_5Br$ (where 0<p≤0.3 and 0<q≤0.3), $Li_{3-p}Cu_pIn_{1-q}Ga_qCl_5Br$ (where 0<p≤0.3 and 0<q≤0.3), $Li_{3-p}Na_pIn_{1-q}Ga_qCl_5Br$ (where 0<p≤0.3 and 0<q≤0.3), $Li_{3-p}Rb_pIn_{1-q}Ga_qCl_5Br$ (where 0<p≤0.3 and 0<q≤0.3), $Li_{3-p}Cs_pIn_{1-q}Ga_qCl_5Br$ (where 0<p≤0.3 and 0<q≤0.3), $Li_{3-p}Ag_pIn_{1-q}Ga_qCl_5Br$ (where 0<p≤0.3 and 0<q≤0.3), $Li_{3-p}Hg_pIn_{1-q}Ga_qCl_5Br$ (where 0<p≤0.3 and 0<q≤0.3), $Li_{3-p}Tl_pIn_{1-q}Ga_qCl_5Br$ (where 0<p≤0.3 and 0<q≤0.3), $Li_{3-p}K_pIn_{1-q}Ga_qClBr_5$ (where 0<p≤0.3 and 0<q≤0.3), $Li_{3-p}Cu_pIn_{1-q}Ga_qClBr_5$ (where 0<p≤0.3 and 0<q≤0.3), $Li_{3-p}Na_pIn_{1-q}Ga_qClBr_5$ (where 0<p≤0.3 and 0<q≤0.3), $Li_{3-p}Rb_pIn_{1-q}Ga_qClBr_5$ (where 0<p≤0.3 and 0<q≤0.3), $Li_{3-p}Cs_pIn_{1-q}Ga_qClBr_5$ (where 0<p≤0.3 and 0<q≤0.3), $Li_{3-p}Ag_pIn_{1-q}Ga_qClBr_5$ (where 0<p≤0.3 and 0<q≤0.3), $Li_{3-p}Hg_pIn_{1-q}Ga_qClBr_5$ (where 0<p≤0.3 and 0<q≤0.3), or $Li_{3-p}Tl_pIn_{1-q}Ga_qClBr_5$ (where 0<p≤0.3 and 0<q≤0.3).

For example, the compound may include at least one of $Li_{3-p}K_pInCl_6$ (where 0<p≤0.3), $Li_{3-p}Cu_pInCl_6$ (where 0<p≤0.3), $Li_{3-p}Na_pInCl_6$ (where 0<p≤0.3), $Li_{3-p}Rb_pInCl_6$ (where 0<p≤0.3), $Li_{3-p}Cs_pInCl_6$ (where 0<p≤0.3), $Li_{3-p}Ag_pInCl_6$ (where 0<p≤0.3), $Li_{3-p}Hg_pInCl_6$ (where 0<p≤0.3), $Li_{3-p}Tl_pInCl_6$ (where 0<p≤0.3), $Li_{3-p}K_pInCl_5Br$ (where 0<p≤0.3), $Li_{3-p}Cu_pInCl_5Br$ (where 0<p≤0.3), $Li_{3-p}Na_pInCl_5Br$ (where 0<p≤0.3), $Li_{3-p}Rb_pInCl_5Br$ (where 0<p≤0.3), $Li_{3-p}Cs_pInCl_5Br$ (where 0<p≤0.3), $Li_{3-p}Ag_pInCl_5Br$ (where 0<p≤0.3), $Li_{3-p}Hg_pInCl_5Br$ (where 0<p≤0.3), $Li_{3-p}Tl_pInCl_5Br$ (where 0<p≤0.3), $Li_{3-p}K_pIn_{1-q}Ga_qCl_6$ (where 0<p≤0.3 and 0<q≤0.3), $Li_{3-p}Cu_pIn_{1-q}Ga_qCl_6$ (where 0<p≤0.3 and 0<q≤0.3), $Li_{3-p}Na_pIn_{1-q}Ga_qCl_6$ (where 0<p≤0.3 and 0<q≤0.3), $Li_{3-p}Rb_pIn_{1-q}Ga_qCl_6$ (where 0<p≤0.3 and 0<q≤0.3), $Li_{3-p}Cs_pIn_{1-q}Ga_qCl_6$ (where 0<p≤0.3 and 0<q≤0.3), $Li_{3-p}Ag_pIn_{1-q}Ga_qCl_6$ (where 0<p≤0.3 and 0<q≤0.3), $Li_{3-p}Hg_pIn_{1-q}Ga_qCl_6$ (where 0<p≤0.3 and 0<q≤0.3), $Li_{3-p}Tl_pIn_{1-q}Ga_qCl_6$ (where 0<p≤0.3 and 0<q≤0.3), $Li_{3-p}K_pIn_{1-q}Ga_qCl_5Br$ (where 0<p≤0.3 and 0<q≤0.3), $Li_{3-p}Cu_pIn_{1-q}Ga_qCl_5Br$ (where 0<p≤0.3 and 0<q≤0.3), $Li_{3-p}Na_pIn_{1-q}Ga_qCl_5Br$ (where 0<p≤0.3 and 0<q≤0.3), $Li_{3-p}Rb_pIn_{1-q}Ga_qCl_5Br$ (where 0<p≤0.3 and 0<q≤0.3), $Li_{3-p}Cs_pIn_{1-q}Ga_qCl_5Br$ (where 0<p≤0.3 and 0<q≤0.3), $Li_{3-p}Ag_pIn_{1-q}Ga_qCl_5Br$ (where 0<p≤0.3 and 0<q≤0.3), $Li_{3-p}Hg_pIn_{1-q}Ga_qCl_5Br$ (where 0<p≤0.3 and 0<q≤0.3), or $Li_{3-p}Tl_pIn_{1-q}Ga_qCl_5Br$ (where 0<p≤0.3 and 0<q≤0.3).

The compound may have the halide-based compound crystal structure maintained within the types and content ranges of the substituted metal having an oxidation state of +1 and/or metal having an oxidation state of +3. In the crystal structure, the metal having an oxidation state of +1 and/or the metal having an oxidation state of +3 may be substituted. As a result, a solid ion conductor including the compound may have increased ionic conductivity.

The solid ion conductor may have an ionic conductivity equal to or greater than about $3.5 \times 10^{-4}$ millisiemens per centimeter (mS·cm$^{-1}$) at 25° C. For example, the solid ion conductor may have an ionic conductivity equal to or greater than about $3.6 \times 10^{-4}$ mS·cm$^{-1}$, an ionic conductivity equal to or greater than about $3.7 \times 10^{-4}$ mS·cm$^{-1}$, an ionic conductivity equal to or greater than about $3.8 \times 10^{-4}$ mS·cm$^{-1}$, an ionic conductivity equal to or greater than about $3.9 \times 10^{-4}$ mS·cm$^{-1}$, an ionic conductivity equal to or greater than about $4.0 \times 10^{-4}$ mS·cm$^{-1}$, an ionic conductivity equal to or greater than about $4.1 \times 10^{-4}$ mS·cm$^{-1}$, an ionic conductivity equal to or greater than about $4.2 \times 10^{-4}$ mS·cm$^{-1}$, an ionic conductivity equal to or greater than about $4.3 \times 10^{-4}$ mS·cm$^{-1}$, an ionic conductivity equal to or greater than about $4.4 \times 10^{-4}$ mS·cm$^{-1}$, an ionic conductivity equal to or greater than about $4.5 \times 10^{-4}$ mS·cm$^{-1}$, an ionic conductivity equal to or greater than about $4.6 \times 10^{-4}$ mS·cm$^{-1}$, an ionic conductivity equal to or greater than about $4.7 \times 10^{-4}$ mS·cm$^{-1}$, an ionic conductivity equal to or greater than about $4.8 \times 10^{-4}$ mS·cm$^{-1}$, an ionic conductivity equal to or greater than about $4.9 \times 10^{-4}$ mS·cm$^{-1}$, an ionic conductivity equal to or greater than about $5.0 \times 10^{-4}$ mS·cm$^{-1}$, an ionic conductivity equal to or greater than about $5.1 \times 10^{-4}$ mS·cm$^{-1}$, an ionic conductivity equal to or greater than about $5.2 \times 10^{-4}$ mS·cm$^{-1}$, or an ionic conductivity equal to or greater than about $5.3 \times 10^{-4}$ mS·cm$^{-1}$ at 25° C. The solid ion conductor may have an ion conductivity of about $3.5 \times 10^{-4}$ mS/cm to about $1 \times 10^{-2}$ S/cm, about $4.0 \times 10-4$ mS/cm to about $0.5 \times 10^{-2}$ S/cm, or about $4.5 \times 10-4$ mS/cm to about to about $1 \times 10^{-3}$ S/cm. The ionic conductivity of the solid ion conductor can be measured by electrochemical impedance spectroscopy (EIS). See, for example, J.-M. Winand et al., "Measurement of Ionic Conductivity in Solid Electrolytes," Europhysics Letters, vol. 8, no. 5, p. 447-452, 1989, the content of which is included herein by reference.

Solid Electrolyte and Electrochemical Device

A solid electrolyte according to another embodiment may include the above-described solid ion conductor. The solid electrolyte may further comprise at least one of an oxide solid electrolyte, or a sulfide solid electrolyte. Also, the solid electrolyte may be in the form of a layer to provide a solid electrolyte layer. The solid electrolyte layer may have a thickness that is less than 0.1 times a width or length of the layer, e.g., a thickness that is $1 \times 10^{-6}$ to 0.1 times a width or length of the layer. The solid electrolyte may be electrochemically stable between 0.6 volt to 4.2 volts versus Li/Li$^+$. "Electrochemically stable" means that the solid electrolyte is neither oxidized or reduced at the recited potential and/or when in contact with lithium metal. An electrochemical stability window for a solid electrolyte can be evaluated using cyclic voltammetry using a symmetric cell wherein the solid electrolyte is between lithium metal electrodes. An electrochemical device including the solid electrolyte may have increased ionic conductivity and improved charging and discharging characteristics.

An electrochemical device according to another embodiment may include a positive electrode layer, a negative electrode layer, and a solid electrolyte layer disposed between the positive electrode layer and the negative electrode layer, and also include the above-described solid electrolyte.

The solid electrolyte may be included in at least one of the solid electrolyte layer, the positive electrode layer, the negative electrode layer, a protective film on the positive electrode layer, or a protective film on the negative electrode layer.

The solid electrolyte layer may include a solid electrolyte, which may include at least one of the solid electrolyte, a sulfide solid electrolyte, or an oxide solid electrolyte.

The sulfide-based solid electrolyte may include a solid electrolyte represented by Formula 3 below.

$$\mathrm{Li^+_{12-n-r}A^{n+}X^{2-}_{6-r}Y'^-_r}.$$ Formula 3

In Formula 3,

A may be P, As, Ge, Ga, Sb, Si, Sn, Al, In, Tl, V, Nb, or Ta,

X may be at least one of S, Se, or Te,

Y' may be at least one of Cl, Br, I, F, CN, OCN, SCN, or N$_3$, $1 < n < 5$ and $0 < r < 2$.

The sulfide-based solid electrolyte may be an Argyrodite-type compound including at least one of Li$_{7-x}$PS$_{6-x}$Cl$_x$ (where $0 \le x \le 2$), Li$_{7-x}$PS$_{6-x}$Br$_x$ (where $0 \le x \le 2$), or Li$_{7-x}$PS$_{6-x}$I$_x$ (where $0 \le x \le 2$). For example, the sulfide-based solid electrolyte may be an Argyrodite-type compound including at least one of Li$_6$PS$_5$Cl, Li$_6$PS$_5$Br, or Li$_6$PS$_5$I. "Argyrodite" or "argyrodite-type" as used herein means that the compound has a crystal structure isostructural with argyrodite, Ag$_8$GeS$_6$.

If desired, the sulfide-based solid electrolyte may include at least one of Li$_2$S—P$_2$S$_5$, Li$_2$S—P$_2$S$_5$—LiX (where X is a halogen element), Li$_2$S—P$_2$S$_5$—Li$_2$O, Li$_2$S—P$_2$S$_5$—Li$_2$O—LiI, Li$_2$S—SiS$_2$, Li$_2$S—SiS$_2$—LiI, Li$_2$S—SiS$_2$—LiBr, Li$_2$S—SiS$_2$—LiCl, Li$_2$S—SiS$_2$—B$_2$S$_3$—LiI, Li$_2$S—SiS$_2$—P$_2$S$_5$—LiI, Li$_2$S—B$_2$S$_3$, Li$_2$S—P$_2$S$_5$—Z$_m$S$_n$ (where m and n are positive numbers and Z is Ge, Zn, or Ga), Li$_2$S—GeS$_2$, Li$_2$S—SiS$_2$—Li$_3$PO$_4$, or Li$_2$S—SiS$_2$—Li$_p$MO$_q$ (where p and q are positive numbers and M is P, Si, Ge, B, Al, Ga, or In). For example, the sulfide-based solid electrolyte may include Li$_2$S—P$_2$S$_5$. When the sulfide-based solid electrolyte is Li$_2$S—P$_2$S$_5$, a molar mixing ratio of Li$_2$S to P$_2$S$_5$ may be, for example, in the range of 50:50 to 90:10.

The oxide-based solid electrolyte may be Garnet-based ceramics having the formula Li$_{3+x}$La$_3$M$_2$O$_{12}$ (where M is at least one of Te, Nb, or Zr, and x is an integer of 1 to 10), lithium phosphorus oxynitride (Li$_x$PO$_y$N$_z$ where $0 < x < 1$, $0 < y < 1$, and $0 < z < 1$), LiPON, Li$_x$P$_y$O$_z$N$_k$ (where $2.7 \le x \le 3.3$, $0.8 \le y \le 1.2$, $3.5 \le z \le 3.9$, and $0.1 \le k \le 0.5$), Li$_w$PO$_x$N$_y$S$_z$ (where $0 < w < 1$, $0 < x < 1$, $0 < y < 1$, and $0 < z < 1$), Li$_{1+x+y}$Al$_x$Ti$_{2-x}$Si$_y$P$_{3-y}$O$_{12}$ (where $0 < x < 2$ and $0 \le y < 3$), BaTiO$_3$, Pb(Zr$_x$Ti$_{1-x}$)O$_3$ (PZT) ($0 \le x \le 1$), Pb$_{1-x}$La$_x$Zr$_{1-y}$Ti$_y$O$_3$ (PLZT, where $0 \le x < 1$ and $0 \le y < 1$), Pb(Mg$_{1/3}$Nb$_{2/3}$)O$_3$—PbTiO$_3$ (PMN-PT), HfO$_2$, SrTiO$_3$, SnO$_2$, CeO$_2$, Na$_2$O, MgO, NiO, CaO, BaO, ZnO, ZrO$_2$, Y$_2$O$_3$, Al$_2$O$_3$, TiO$_2$, SiO$_2$, SiC, lithium phosphate (Li$_3$PO$_4$), lithium titanium phosphate (Li$_x$Ti$_y$(PO$_4$)$_3$, where $0 < x < 2$ and $0 < y < 3$), lithium aluminum titanium phosphate (Li$_x$Al$_y$Ti$_z$(PO$_4$)$_3$, where $0 < x < 2$, $0 < y < 1$, and $0 < z < 3$), Li$_{1+x+y}$(Al$_a$Ga$_{1-a}$)$_x$(Ti$_b$Ge$_{1-b}$)$_{2-x}$Si$_y$P$_{3-y}$O$_{12}$ (where $0 < x < 1$, $0 < y < 1$, $0 \le a \le 1$, and $0 \le b \le 1$), lithium lanthanum titanate (Li$_x$La$_y$TiO$_3$, where $0 < x < 2$ and $0 < y < 3$), lithium germanium thiophosphate (Li$_x$Ge$_y$P$_z$S$_w$, where $0 < x < 4$, $0 < y < 1$, $0 < z < 1$, and $0 < w < 5$), lithium nitride-based glass (Li$_x$N$_y$, where $0 < x < 4$ and $0 < y < 2$), SiS$_2$-type glass (Li$_x$Si$_y$S$_z$, where $0 < x < 3$, $0 < y < 2$, $0 < z < 4$), P$_2$S$_5$-type glass (Li$_x$P$_y$S$_z$, where $0 < x < 3$, $0 < y < 3$, $0 < z < 7$), Li$_2$O, LiF, LiGH, Li$_2$CO$_3$, LiAlO$_2$, or a Li$_2$O—Al$_2$O$_3$—SiO$_2$—P$_2$O$_5$—TiO$_2$—GeO$_2$-based ceramic. For example, as the oxide-based electrolyte, a Garnet-based oxide-based solid electrolyte having excellent reduction stability upon contact with a lithium negative electrode may be used. As the Garnet-based ceramics Li$_{3+x}$La$_3$M$_2$O$_{12}$ (where M is at least one of Te, Nb, or Zr), for example, $Li_{6.5}La_3Zr_{1.5}Ta_{0.5}O_{12}$ (LLZO) may be used. As used herein, the term "garnet" or "garnet-based" means that the compound is isostructural with garnet, e.g., $Mg_3Al_2(SiO_4)_3$.

The solid electrolyte may further include a binder. For example, as the binder included in the solid electrolyte, at least one of styrene butadiene rubber (SBR), polytetrafluoroethylene, polyvinylidene fluoride, or polyethylene may be used. However, the embodiment is not limited thereto and any suitable binder may also be used.

In desired, the solid electrolyte may further include an organic solid electrolyte. As the organic solid electrolyte, for example, polyethylene derivatives, polyethylene oxide derivatives, polypropylene oxide derivatives, phosphoric acid ester polymers, polylysine, polyester sulfide, polyvinyl alcohol, polyvinylidene fluoride, and polymers including ionic dissociation groups may be used. If desired, the solid electrolyte may further include an amorphous solid electrolyte. The solid electrolyte may further include a mixed solid electrolyte in which a crystalline solid electrolyte and an amorphous solid electrolyte are mixed. If desired, the solid electrolyte may further include a lithium salt and/or an ionic liquid.

If desired, the solid electrolyte may further include an ion-conductive inorganic material.

The ion-conductive inorganic material may include at least one of a glass or amorphous metal ion conductor, a ceramic activated metal ion conductor, or a glass ceramic activated metal ion conductor, but is not limited thereto, and any materials used in the art as the ion-conductive inorganic material may also be used. The ion-conductive inorganic material may be in the form of, for example, ion-conductive inorganic particles or sheets thereof.

The ion-conductive inorganic material may comprise an oxide-based solid electrolyte. In an aspect, the ion-conductive inorganic material may comprise at least one of $BaTiO_3$, $Pb(Zr_x, Ti_{1-x})O_3$ (PZT) ($0 \leq x \leq 1$), $Pb_{1-x}La_xZr_{1-y}Ti_yO_3$ (PLZT, where $0 \leq x < 1$ and $0 \leq y < 1$), $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$, where $0<x<2$ and $0<y<3$), lithium aluminum titanium phosphate ($Li_xAl_yTi_z(PO_4)_3$, where $0<x<2$, $0<y<1$, and $0<z<3$), $Li_{1+x+y}(Al_aGa_{1-a})_x(Ti_bGe_{1-b})_{2-x}Si_yP_{3-y}O_{12}$ (where $0<x<1$, $0<y<1$, $0 \leq a \leq 1$, and $0 \leq b \leq 1$), lithium lanthanum titanate ($Li_xLa_yTiO_3$, where $0<x<2$ and $0<y<3$), lithium germanium thiophosphate ($Li_xGe_yP_zS_w$, where $0<x<4$, $0<y<1$, $0<z<1$, and $0<w<5$), lithium nitride-based glass ($Li_xN_y$, where $0<x<4$ and $0<y<2$), $SiS_2$-type glass ($Li_xSi_yS_z$, where $0<x<3$, $0<y<2$, and $0<z<4$), $P_2S_5$-type glass ($Li_xP_yS_z$, where $0<x<3$, $0<y<3$, and $0<z<7$), $Li_2O$, LiF, LiGH, $Li_2CO_3$, $LiAlO_2$, a $Li_2O$—$Al_2O_3$—$SiO_2$—$P_2O_5$—$TiO_2$—$GeO_2$-based ceramic, or a Garnet-based ceramics (e.g., $Li_{3+x}La_3M_2O_{12}$, where M is at least one of Te, Nb, or Zr).

The solid electrolyte may be in the form of a powder or a molded product. The solid electrolyte in the form of a molded product may be in the form of pellets, sheets, thin films, or the like, without being limited thereto and may also have various shapes according to the intended use.

The solid electrolyte layer may have a thickness of about 10 μm to about 1 mm, about 15 μm to about 900 μm, about 20 μm to about 800 μm, or about 30 μm to about 500 μm. The solid electrolyte layer may have a single-layered structure or a multi-layered structure including two or more layers.

For example, the solid electrolyte may include the solid ion conductor including the compound represented by Formula 1 alone in the solid electrolyte layer. Alternatively, the solid electrolyte layer may further include an oxide-based solid electrolyte or a sulfide-based solid electrolyte, as a separate layer, in addition to the solid ion conductor.

For example, the solid electrolyte may include the solid ion conductor represented by Formula 1 alone in the positive electrode layer and/or the negative electrode layer. Alternatively, in addition to the solid ion conductor, at least one of a sulfide-based solid electrolyte, an oxide-based solid electrolyte, or an ionic liquid-containing electrolyte may be included in the positive electrode layer and/or the negative electrode layer as a separate single-layered or multi-layered structure. For example, the electrochemical device may sequentially include a positive electrode layer, an ionic liquid-containing electrolyte, an oxide-based solid electrolyte (or a sulfide-based solid electrolyte), the solid electrolyte including the compound represented by Formula 1, an oxide-based solid electrolyte (or a sulfide-based solid electrolyte), and a negative electrode layer.

The electrochemical device may be an all-solid secondary battery or a metal air battery. However, the embodiment is not limited thereto and any electrochemical devices available in the art may also be used.

For example, the electrochemical device may be an all-solid secondary battery.

Figure 2:
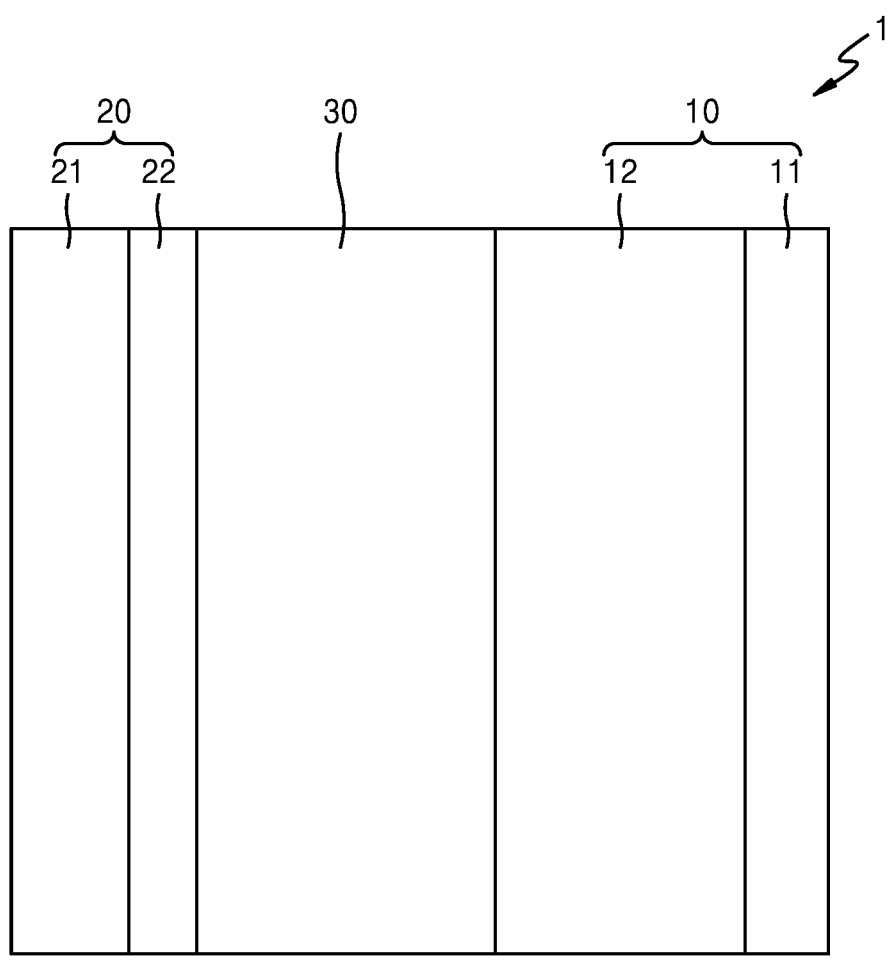
FIGS. 2 to 4 are each a cross-sectional view of an embodiment of an all-solid secondary battery.
Figure 3:
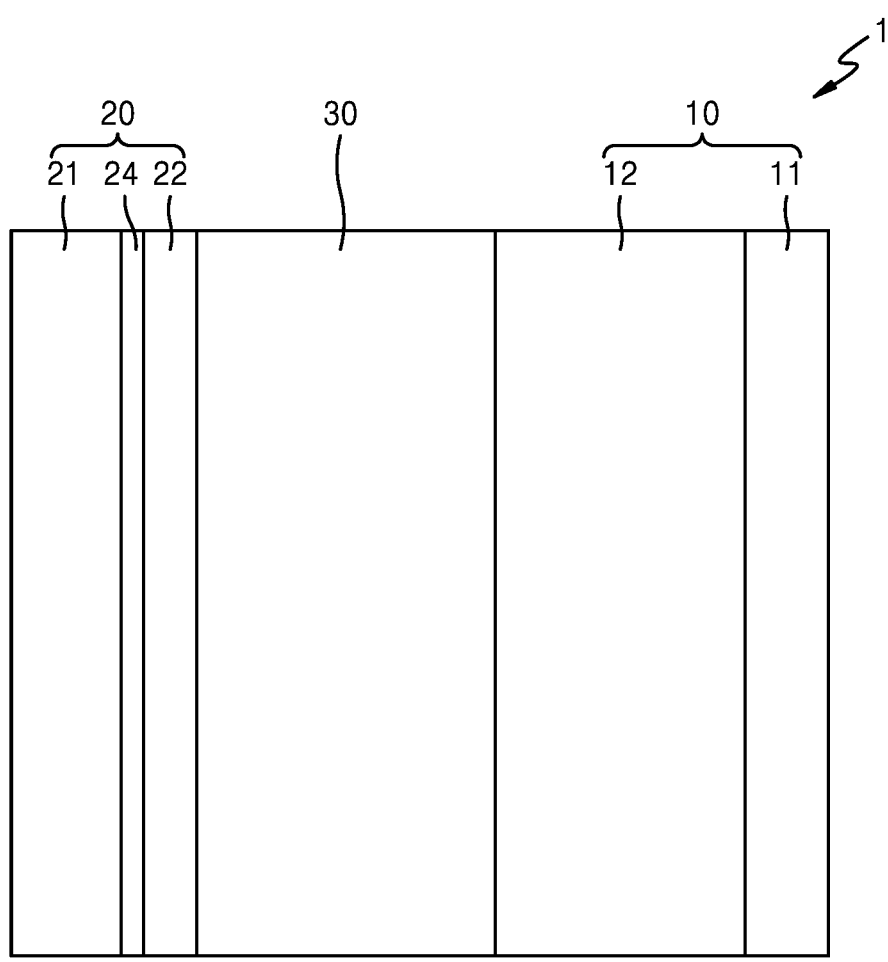
Figure 4:
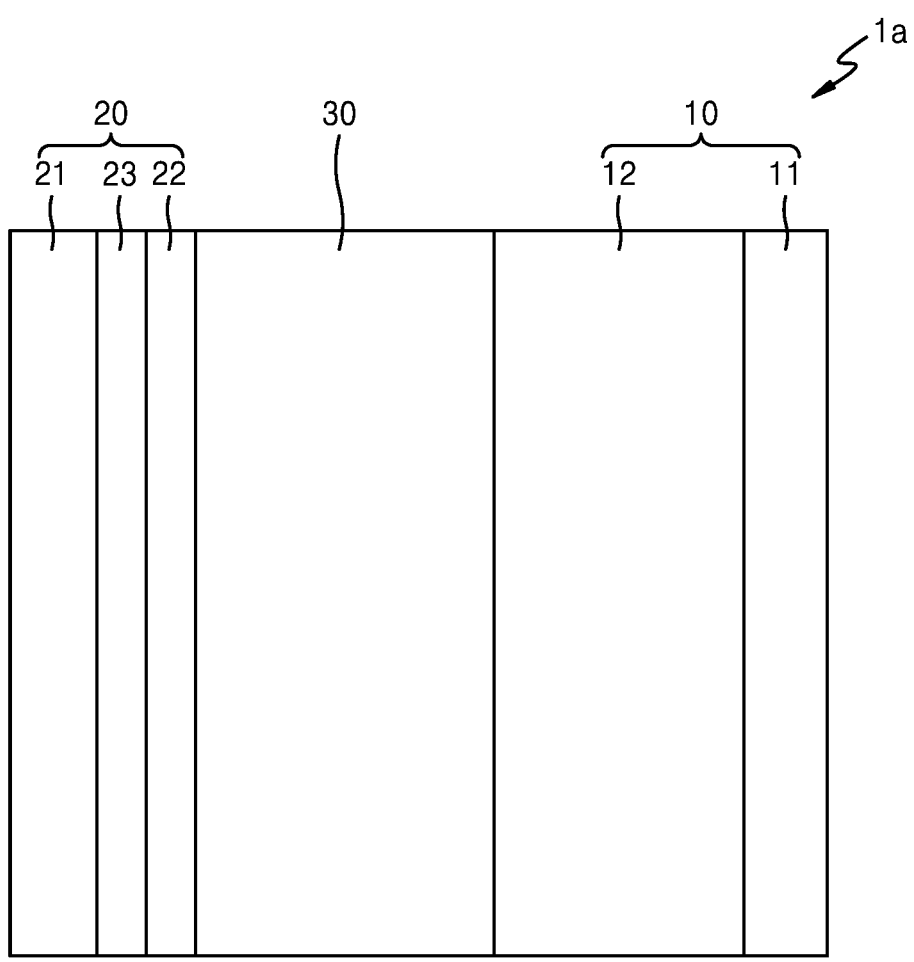

FIGS. 2 to 4 are cross-sectional views of an all-solid secondary battery according to an embodiment.

Referring to FIGS. 2 to 4, an all-solid secondary battery 1 includes a positive electrode layer 10 including a positive current collector 11 and a positive active material layer 12; a negative electrode layer 20; and a solid electrolyte layer 30 between the positive electrode layer 10 and the negative electrode layer 20, wherein the negative electrode layer 20 includes a negative current collector 21; and a negative active material layer 22 on the negative current collector 21, and the negative active material layer 22 includes lithium metal, and a negative active material forming an alloy or compound with lithium. At least one of the positive electrode layer 10; the negative electrode layer 20; or the solid electrolyte layer 30 of the all-solid secondary battery 1 may include the solid ion conductor including the compound represented by Formula 1.

The positive current collector 11 may be formed of, for example, indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof in the form of a plate or foil. The positive current collector 11 may be omitted.

The positive active material layer 12 may include a positive active material and/or a solid electrolyte. The solid electrolyte included in the positive electrode layer 10 may be the same as or different from the solid electrolyte included in the solid electrolyte layer 30.

The positive active material may be any suitable positive active material allowing reversible intercalation and deintercalation of lithium ions. The positive active material may include at least one of a lithium transition metal oxide, a lithium transition metal phosphate, or a sulfide. For example, the positive active material may be formed using at least one of lithium cobalt oxide (LCO), lithium nickel oxide, lithium nickel cobalt oxide, lithium nickel cobalt aluminum oxide (NCA), lithium nickel cobalt manganese oxide (NCM), lithium manganate, lithium iron phosphate, nickel sulfide, copper sulfide, lithium sulfide, iron oxide, vanadium oxide, or the like. The positive active material may be formed of each of the above compounds alone, or a combination of at least two thereof. For example, the positive active material may be a lithium salt of a ternary transition metal oxide such as $LiNi_xCo_yAl_zO_2$ (NCA) or $LiNi_xCo_yMn_zO_2$ (NCM) (where $0<x<1$, $0<y<1$, $0<z<1$, and $x+y+z=1$ are satisfied).

The positive active material may include a coating layer formed on the surface thereof. The coating layer may be formed of any material commonly used to form a coating layer of a positive active material of all-solid secondary batteries. For example, the coating layer may be formed of $Li_2O$—$ZrO_2$ or the like.

In addition, when the positive active material is formed of a lithium salt of a ternary transition metal oxide such as NCA or NCM including nickel (Ni), metal elution of the positive active material may be reduced during charging by increasing capacity density of the all-solid secondary battery 1. The all-solid secondary battery 1 may have improved long-term reliability and cycle characteristics during charging.

The positive active material may have a particulate shape such as an oval spherical shape or a spherical shape. Also, a particle diameter of the positive active material is not particularly limited and may be in a range applicable to positive active materials of all-solid secondary batteries. The amount of the positive active material of the positive electrode layer 10 is not particularly limited and may be in a range applicable to positive electrodes of all-solid secondary batteries.

During a charging and discharging process of the positive active material, cation mixing in which a metal ion having an oxidation state of +1 is inserted into a transfer path of lithium ions may occur.

The positive electrode layer 10 may further include an ion-conductive inorganic material. Types of the ion-conductive inorganic material are as those described above and descriptions thereof will be omitted.

The positive electrode layer 10 may further include, for example, at least one of a conductive agent, a binder, a filler, a dispersant, or an ion-conductive adjuvant, which are appropriately mixed, in addition to the positive active material and/or the solid electrolyte described above.

The conductive agent that may be included in the positive electrode layer 10 may be at least one of graphite, carbon black, acetylene black, Ketjen black, carbon fiber, or metal powder. The binder that may be included in the positive electrode layer 10 may be at least one of styrene butadiene rubber (SBR), polytetrafluoroethylene, polyvinylidene fluoride, or polyethylene. A coating agent, the dispersant, and the ion-conductive adjuvant that may be included in the positive electrode layer 10 may be any known material commonly used in electrodes of all-solid secondary batteries.

The negative electrode layer 20 may include the negative current collector 21 and the negative active material layer 22.

A material constituting the negative current collector 21 may be at least one of copper (Cu), stainless steel, titanium (Ti), iron (Fe), cobalt (Co), or nickel (Ni). The negative current collector 21 may be formed of one of the metals of an alloy or a coating material of at least two of the metals. The negative current collector 21 may be formed in a plate or foil shape.

The negative active material layer 22 may include one or more of a metallic negative active material, or a carbonaceous negative active material.

The negative active material may include a metallic negative active material, a carbonaceous negative active material, or any combination thereof. For example, the negative active material may include lithium or an alloy including lithium and at least one of indium (In), silicon (Si), gallium (Ga), tin (Sn), aluminum (Al), titanium (Ti), zirconium (Zr), niobium (Nb), germanium (Ge), antimony (Sb), bismuth (Bi), gold (Au), platinum (Pt), palladium (Pd), magnesium (Mg), silver (Ag), or zinc (Zn). However, the embodiment is not limited thereto and any metal or metalloid alloyable with lithium and well known in the art may also be used.

As the carbonaceous negative active material, graphite, carbon black (CB), acetylene black (AB), furnace black (FB), Ketjen black (KB), graphene, carbon nanotube, or carbon nanofiber or a combination thereof may be used.

The negative active material layer 22 may include at least one of a conductive agent, a binder, a filler, a dispersant, or an ion-conductive adjuvant, which are appropriately mixed.

If desired, the negative active material layer 22 may be a negative electrode-free coating layer. For example, the negative electrode-free coating layer may include a metal such as silicon and carbon and have a structure in which a conductive binder is arranged around the metal and carbon. The negative electrode-free coating layer may have a thickness of 1 μm to 20 μm, about 2 μm to about 15 μm, or about 4 μm to about 12 μm.

The solid electrolyte layer 30 may be formed by deposition using a known method for layer formation such as aerosol deposition, cold spray, or sputtering. Alternatively, the solid electrolyte layer 30 may be formed by pressurizing particles of the solid electrolyte. Alternatively, the solid electrolyte layer 30 may be formed by mixing the solid electrolyte, a solvent, and a binder, and pressurizing the mixture.

As shown in FIG. 3, a thin film 24 may be formed on the surface of the negative current collector 21. The thin film 24 may include an element alloyable with lithium. As the element alloyable with lithium, for example, gold, silver, zinc, tin, indium, silicon, aluminum, or bismuth may be used. The thin film 24 may be formed of one type of the metals or an alloy of various types thereof. Due to the presence of the thin film 24, a deposition pattern of a metal layer 23 as shown in FIG. 4 may be further flattened, and characteristics of the all-solid secondary battery 1 may further be improved.

The thin film 24 may have a thickness of 1 nm to 500 nm, about 50 nm to about 450 nm, about 100 nm to about 400 nm, or about 150 nm to about 350 nm, without being limited thereto. When the thickness of the thin film 24 is within the above range, functions of the thin film 24 are sufficiently exhibited, and an appropriate amount of lithium is precipitated in the negative electrode layer, thus the all-solid secondary battery 1 may have excellent characteristics. The thin film 24 may be formed on the negative current collector 21 by vacuum deposition, sputtering, plating, or the like.

Method of Preparing Solid Ion Conductor

A method of preparing a solid ion conductor according to an embodiment may include: providing a solid ion conductor-forming precursor mixture; mechanically milling the solid ion conductor-forming precursor mixture; and heat-treating the solid ion conductor-forming precursor mixture at a temperature above 40° C. and below 300° C. to prepare the solid ion conductor:

$$Li_aM_bIn_cX_d \qquad \text{Formula 1}$$

In Formula 1,

M may be at least one of a metal having an oxidation state of +1 or a metal having an oxidation state of +3, X may be at least one of halogen, $2.5<a<3.5$, $0<b<0.5$, $0.5<c<1.5$, and $5<d<7$.

According to the method of preparing the solid ion conductor, a solid ion conductor, which has increased ionic conductivity and electrochemical stability in a wide voltage window and improved charging and discharging characteristics when used in an electrochemical device, may be easily prepared at a low temperature.

When the solid ion conductor-forming precursor mixture is prepared, a Li precursor, a M precursor, an In precursor, and a halogen precursor may be mixed. The M precursor may be a precursor of a metal element having an oxidation state of +1 and/or a precursor of a metal element having an oxidation state of +3.

The Li precursor and the M precursor may include at least one of a halide such as a chloride, oxide, nitride, oxynitride, nitrate, hydroxide, or carbonate of lithium. For example, the Li precursor may be lithium chloride. For example, the M precursor may include at least one of a halide such as a chloride, oxide, nitride, oxynitride, nitrate, hydroxide, or carbonate of sodium, potassium, rubidium, cesium, silver, gold, copper, mercury, thallium, gallium, scandium, yttrium, lanthanum, lutetium, gadolinium, or a combination thereof. For example, the M precursor may include at least one of a chloride of sodium, potassium, rubidium, cesium, silver, gold, copper, mercury, thallium, gallium, or a combination thereof. For example, the M precursor may include a chloride of at least one of sodium, potassium, copper, or gallium.

The compound may be prepared by preparing a mixture by bringing starting materials into contact with each other in appropriate amounts, for example, stoichiometric amounts. The mixture is mechanically milled.

The mechanical milling may be performed by using a ball-mill, an airjet-mill, a bead mill, a roll-mill, a planetary mill, a hand mill, a high energy ball mill, a stirred ball mill, a vibrating mill, a mechanofusion mill, a shaker mill, an attritor mill, a disk mill, a shape mill, a nauta mill, a nobilta mill, a high speed mixer, or any combination thereof. For example, the mechanical milling may be planetary milling performed at room temperature, e.g., about 23° C. The method may further include molding the mixture after performing the mechanical milling.

Hereinafter, the present disclosure will be described in more detail with reference to the following examples and comparative examples. However, the following examples are merely presented to exemplify the present disclosure and the scope of the present disclosure is not limited thereto.

EXAMPLES

Example 1: Preparation of $Li_{2.99}K_{0.01}InCl_6$ Solid Ion Conductor

LiCl as a Li precursor, KCl as a potassium precursor, and $InCl_3$ as an indium precursor were added to a reactor in a stoichiometric ratio of 2.99:0.01:1 and mixed to prepare a solid ion conductor-forming precursor mixture. The solid ion conductor-forming precursor mixture was added to a planetary mill (Pulverisette 7 premium line) containing zirconia (YSZ) balls having a diameter of 10 mm, and a cycle of mixing at 500 rpm for 10 minutes and resting for 5 minutes was repeated for 24 hours in total to prepare a precursor mixture. The precursor mixture was added to a 1-inch diameter pelletizer and a weight of 5 tons was applied thereto using a uniaxial pressure for 2 minutes to prepare $Li_{2.99}K_{0.01}InCl_6$ solid ion conductor pellets in the form of circular disks.

Example 2: Preparation of $Li_{2.97}K_{0.03}InCl_6$ Solid Ion Conductor $Li_{2.97}K_{0.03}InCl_6$ solid ion conductor pellets were prepared in the same manner as in Example 1, except that the stoichiometric ratio of LiCl as a Li precursor, KCl as a potassium precursor, and $InCl_3$ as an indium precursor contained in the reactor was 2.97:0.03:1.

Example 3: Preparation of $Li_{2.95}K_{0.05}InCl_6$ Solid Ion Conductor $Li_{2.95}K_{0.05}InCl_6$ solid ion conductor pellets were prepared in the same manner as in Example 1, except that the stoichiometric ratio of LiCl as a Li precursor, KCl as a potassium precursor, and $InCl_3$ as an indium precursor was 2.95:0.05:1.

Example 4: Preparation of $Li_{2.9}K_{0.1}InCl_6$ Solid Ion Conductor $Li_{2.9}K_{0.1}InCl_6$ solid ion conductor pellets were prepared in the same manner as in Example 1, except that the stoichiometric ratio of LiCl as a Li precursor, KCl as a potassium precursor, and $InCl_3$ as an indium precursor contained in the reactor was 2.9:0.1:1.

Example 5: Preparation of $Li_{2.99}Cu_{0.01}InCl_6$ Solid Ion Conductor $Li_{2.99}Cu_{0.01}InCl_6$ solid ion conductor pellets were prepared in the same manner as in Example 1, except that the stoichiometric ratio of LiCl as a Li precursor, KCl as a potassium precursor, and $InCl_3$ as an indium precursor contained in the reactor was 2.99:0.01:1.

Example 6: Preparation of $Li_{2.95}Cu_{0.05}InCl_6$ Solid Ion Conductor $Li_{2.95}Cu_{0.05}InCl_6$ solid ion conductor pellets were prepared in the same manner as in Example 1, except that the stoichiometric ratio of LiCl as a Li precursor, KCl as a potassium precursor, and $InCl_3$ as an indium precursor contained in the reactor was 2.95:0.05:1.

Example 7: Preparation of $Li_{2.7}Cu_{0.3}InCl_6$ Solid Ion Conductor $Li_{2.7}Cu_{0.3}InCl_6$ solid ion conductor pellets were prepared in the same manner as in Example 1, except that the stoichiometric ratio of LiCl as a Li precursor, KCl as a potassium precursor, and $InCl_3$ as an indium precursor contained in the reactor was 2.7:0.3:1.

Example 8: Preparation of $Li_{2.97}Na_{0.03}InCl_6$ Solid Ion Conductor $Li_{2.97}Na_{0.03}InCl_6$ solid ion conductor pellets were prepared in the same manner as in Example 1, except that the stoichiometric ratio of LiCl as a Li precursor, KCl as a potassium precursor, and $InCl_3$ as an indium precursor contained in the reactor was 2.97:0.03:1.

Example 9: Preparation of $Li_{2.95}Na_{0.05}InCl_6$ Solid Ion Conductor $Li_{2.95}Na_{0.05}InCl_6$ solid ion conductor pellets were prepared in the same manner as in Example 1, except that the stoichiometric ratio of LiCl as a Li precursor, KCl as a potassium precursor, and $InCl_3$ as an indium precursor contained in the reactor was 2.95:0.05:1.

Example 10: Preparation of $Li_{2.95}K_{0.05}In_{0.95}Ga_{0.05}Cl_6$ Solid Ion Conductor $Li_{2.95}K_{0.05}In_{0.95}Ga_{0.05}Cl_6$ solid ion conductor pellets were prepared in the same manner as in Example 1, except that the stoichiometric ratio of LiCl as a Li precursor, KCl as a potassium precursor, $InCl_3$ as an indium precursor, and $GaCl_3$ as a gallium precursor contained in the reactor was 2.95:0.05:0.95:0.05.

Example 11: Preparation of $Li_{2.95}K_{0.05}InCl_5Br$ Solid Ion Conductor $Li_{2.95}K_{0.05}InCl_5Br$ solid ion conductor pellets were prepared in the same manner as in Example 1, except that the stoichiometric ratio of LiCl as a Li precursor, KCl as a potassium precursor, and $InCl_3$ as an indium precursor contained in the reactor was 2.95:0.05:1.

Comparative Example 1: Preparation of $Li_3InCl_6$ Solid Ion Conductor $Li_3InCl_6$ solid ion conductor pellets were prepared in the same manner as in Example 1, except that the stoichiometric ratio of LiCl as a Li precursor and $InCl_3$ as an indium precursor contained in the reactor was 3:1.

Comparative Example 2: Preparation of $Li_{2.8}Mg_{0.1}In_{0.9}Cl_6$ Solid Ion Conductor $Li_{2.8}Mg_{0.1}InCl_6$ solid ion conductor pellets were prepared in the same manner as in Example 1, except that the stoichiometric ratio of LiCl as a Li precursor, $MgCl_2$ as a Mg precursor, and $InCl_3$ as an indium precursor contained in the reactor was 2.8:0.1:1.

Example 12: Preparation of All-Solid Secondary Battery

Preparation of Negative Electrode Layer

A Cu current collector having a thickness of 10 μm was placed on the bottom surface of a tube-shaped cell case having an inner diameter of 13 mm, and a foil deposited with In and having a thickness of 20 μm was sequentially disposed on one surface of the Cu current collector to prepare a negative electrode layer.

Preparation of Negative Electrode Layer/Solid Electrolyte Layer Laminate 150 mg of the $Li_{2.99}K_{0.01}InCl_6$ solid ion conductor pellets prepared in Example 1 were disposed on the negative electrode layer, and a pressure of 250 MPa was applied thereto at 25° C. by cold isotactic pressing (CIP) to prepare a Cu current collector layer/In layer/$Li_{2.99}K_{0.01}InCl_6$ solid electrolyte layer laminate (thickness: about 500 μm).

Preparation of Positive Electrode Layer $LiNi_{0.9}Co_{0.07}Mn_{0.03}O_2$ (NCM) as a positive active material, $Li_{2.99}K_{0.01}InCl_6$ solid ion conductor pellets prepared in Example 1 as a solid electrolyte, and carbon nanofiber (CNF) as a conductive agent were mixed in a mass ratio of 60:35:5. 15 mg of the mixture was disposed on an Al foil current collector having a thickness of 18 μm to prepare a positive electrode layer.

Preparation of All-Solid Secondary Battery

The positive electrode layer was placed on the negative electrode layer/solid electrolyte layer laminate and a weight of 4 tons was applied thereto for 2 minutes to prepare a torque cell-type all-solid secondary battery.

Examples 13 to 22: Preparation of All-Solid Secondary Battery

All-solid secondary batteries were prepared in the same manner as in Example 12, except that the solid ion conductor pellets prepared in Examples 2 to 11 were used respectively.

Comparative Examples 3 to 4: Preparation of All-Solid Secondary Battery

All-solid secondary batteries were prepared in the same manner as in Example 12, except that the solid ion conductor pellets prepared in Comparative Examples 1 and 2 were used respectively.

Example 23: Preparation of All-Solid Secondary Battery

Preparation of Negative Electrode Layer

A Cu current collector having a thickness of 10 μm was placed on the bottom surface of a tube-shaped cell case having an inner diameter of 13 mm, and a foil deposited with Li and having a thickness of 20 μm was sequentially disposed on one surface of the Cu current collector to prepare a negative electrode layer.

Preparation of Solid Electrolyte Layer

Argyrodite-type $Li_6PS_5Cl$ solid ion conductor pellets (Mitusi, S33) were prepared.

Preparation of Negative Electrode Layer/Solid Electrolyte Layer Laminate 150 mg of the Argyrodite-type $Li_6PS_5Cl$ solid ion conductor pellets were disposed on the negative electrode layer, and a pressure of 250 MPa was applied thereto at 25° C. by cold isotactic pressing (CIP) to prepare a Cu current collector layer/Li layer/$Li_6PS_5Cl$ solid electrolyte layer laminate (thickness: about 500 μm).

Preparation of Positive Electrode Layer $LiNi_{0.8}Co_{0.15}Mn_{0.05}O_2$ (NCM) as a positive active material, $Li_{2.99}K_{0.01}InCl_6$ solid ion conductor pellets prepared in Example 1 as a solid electrolyte, LiF as an ion-conductive inorganic material, and carbon nanofiber (CNF) as a conductive agent were mixed in a mass ratio of 60:30:5:5. 15 mg of the mixture was disposed on an Al foil current collector having a thickness of 18 μm to prepare a positive electrode layer.

Preparation of All-Solid Secondary Battery

The positive electrode layer was disposed on the negative electrode layer/solid electrolyte layer laminate and a weight of 4 tons was applied thereto for 2 minutes to prepare a torque cell-type all-solid secondary battery.

Examples 24 to 33: Preparation of All-Solid Secondary Battery

All-solid secondary batteries were prepared in the same manner as in Example 23, except that the solid ion conductor pellets prepared in Examples 2 to 11 were used respectively.

Comparative Examples 5 to 6: Preparation of All-Solid Secondary Battery

All-solid secondary batteries were prepared in the same manner as in Example 23, except that the solid ion conductor pellets prepared in Comparative Examples 1 and 2 were used respectively.

Analysis Example 1: XRD Test

Figure 5:
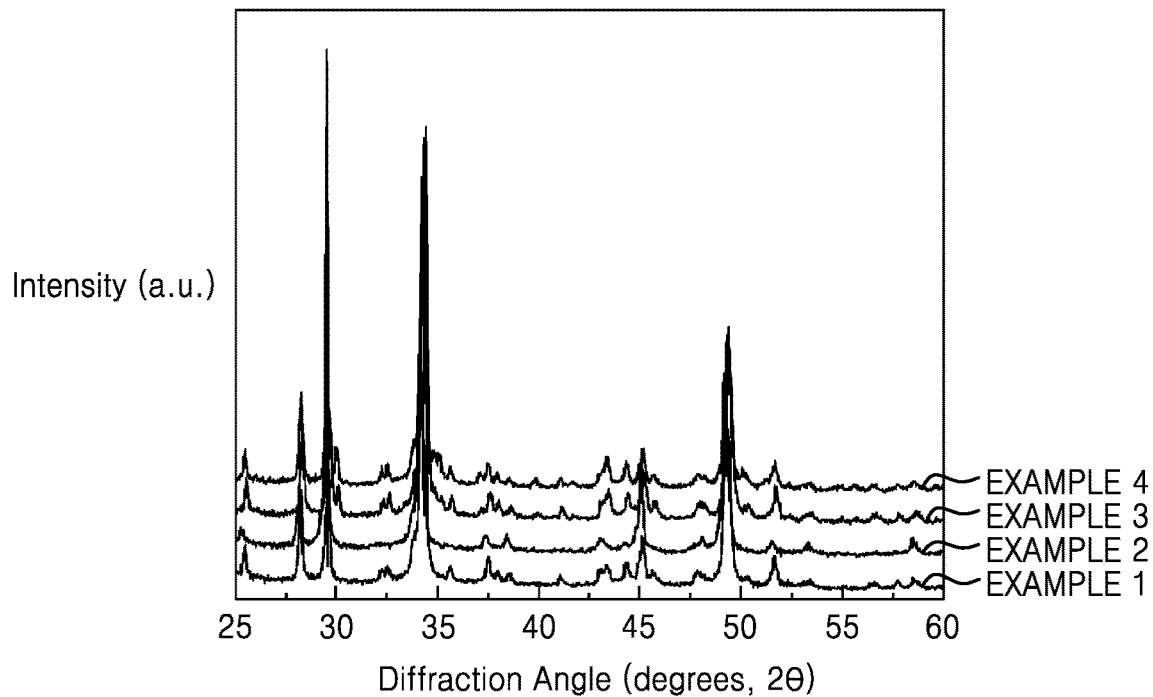
FIG. 5 is a graph of intensity (arbitrary units, a.u.) versus diffraction angle (degrees 2θ) and shows X-ray diffraction (XRD) spectra of solid ion conductor compounds prepared according to Examples 1 to 4.

X-ray diffraction (XRD) spectra of the solid ion conductor compounds prepared according to Examples 1 to 4 and Comparative Example 1 were obtained using CuKα radiation. The XRD spectra were obtained in a diffraction of angle of 25°2θ to 60°2θ at 5°/min. Some of the results are shown in FIG. 5. Enlarged diffraction peaks at a diffraction angle range of 51.5°2θ to 52.0°2θ in the XRD spectra are shown in FIG. 6.

As shown in FIG. 5, it was confirmed that all of the solid ion conductor compounds prepared according to Examples 1 to 4 had diffraction peaks at a diffraction angle of from 28°2θ to 29°2θ, from 29°2θ to 30°2θ, from 32.5°2θ to 35°2θ, from 37°2θ to 38.5°2θ, from 42.5°2θ to 45°2θ, from 47.5°2θ to 50°2θ, and from 51.5°2θ to 52.0°2θ. Based thereon, it may be seen that all of the solid ion conductor compounds prepared according to Examples 1 to 4 belong to the C2/m space group or a C2/m-like space group without changes in crystal structures although all of the solid ion conductor compounds are substituted with $K^+$ cations.

Figure 6:
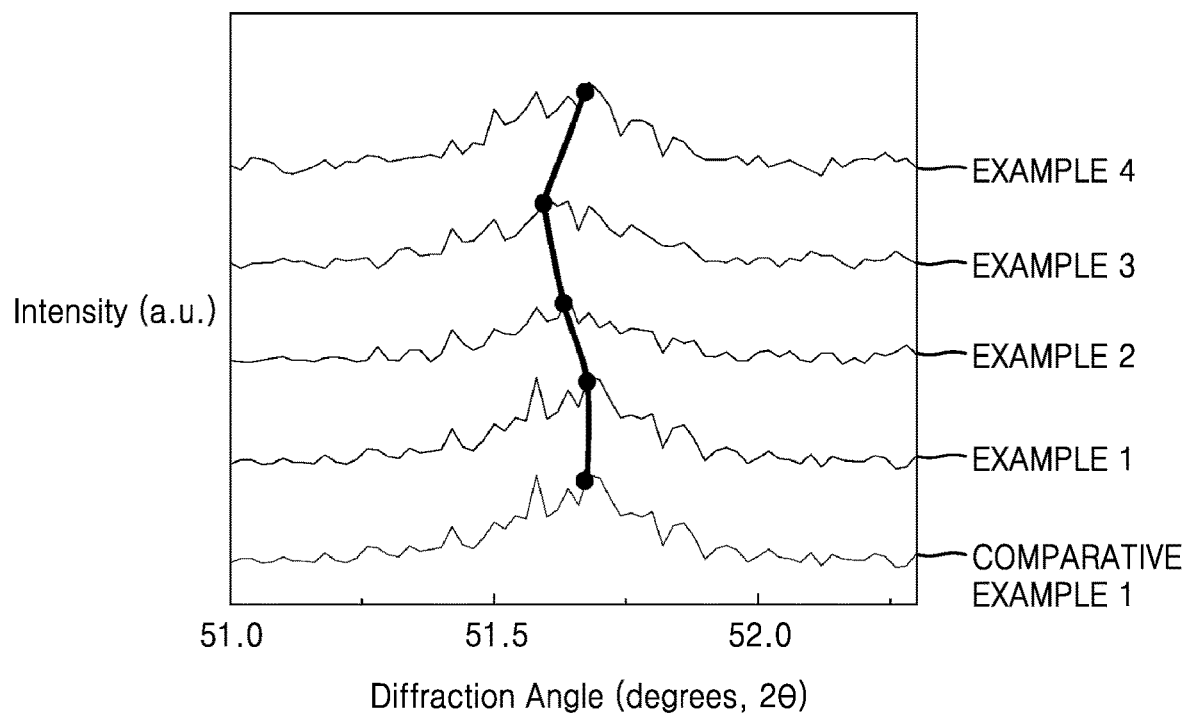
FIG. 6 is a graph of intensity (arbitrary units, a.u.) versus diffraction angle (degrees 2θ) and shows enlarged diffraction peaks at a diffraction angle of 51.5°2θ to 52.0°2θ in XRD spectra of solid ion conductor compounds prepared according to Examples 1 to 4 and Comparative Example 1.

As shown in FIG. 6, it was confirmed that diffraction peaks of the solid ion conductor compounds prepared according to Examples 1 to 3 were shifted to a smaller diffraction angle of 51.5°2θ to 52.0°2θ, when compared with the $Li_3InCl_6$ solid ion conductor compound prepared according to Comparative Example 1. Based thereon, it may be seen that the solid ion conductor prepared according to Examples 1 to 3 had increased crystal lattice sizes when compared with the $Li_3InCl_6$ solid ion conductor.

Evaluation Example 1: Measurement of Ionic Conductivity

The solid ion conductor pellets prepared according to Examples 1 to 11 and Comparative Examples 1 and 2 and having a thickness of about 700 μm were prepared. A platinum (Pt) paste was deposited on both surfaces of the solid ion conductor pellets to a thickness of 10 nm by sputtering to prepare a Pt electrode. Wires were connected to a sample of the Pt electrode at both sides and the sample was analyzed using electrochemical impedance spectroscopy (EIS). The analysis was performed using an amplitude of about 10 mV and a frequency of 0.1 Hz to $10^6$ Hz. Impedance of the pellets was measured using a two-probe method with an impedance analyzer (potentiostat/galvanostat and 1455 frequency response analyzer (FRA) multi-channel test module, Solatron Analytical, UK), at room temperature (25° C.). Resistance was obtained from an arc of a Nyquist plot with respect to measurement results of impedance, and areas of the electrode and pellet thickness were corrected based thereon to calculate ionic conductivity. The results are shown in Table 1 below.

TABLE 1

| | Ionic conductivity (S/cm, @ 25° C.) |
|---|---|
| Example 1 | $6.0 \times 10^{-4}$ |
| Example 2 | $5.3 \times 10^{-4}$ |
| Example 3 | $1.4 \times 10^{-3}$ |
| Example 4 | $8.3 \times 10^{-4}$ |
| Example 5 | $1.2 \times 10^{-3}$ |
| Example 6 | $1.1 \times 10^{-3}$ |
| Example 7 | $7.4 \times 10^{-4}$ |
| Example 8 | $1.1 \times 10^{-3}$ |
| Example 9 | $7.5 \times 10^{-4}$ |
| Example 10 | $1.1 \times 10^{-3}$ |
| Example 11 | $1.0 \times 10^{-3}$ |
| Comparative Example 1 | $3.4 \times 10^{-4}$ |
| Comparative Example 2 | $2.7 \times 10^{-4}$ |

As shown in Table 1, the solid ion conductors prepared in Examples 1 to 11 had greater ionic conductivities than those of the solid ion conductors prepared in Comparative Examples 1 and 2 and exhibited ionic conductivities of $3.5 \times 10^{-4}$ mS·cm$^{-1}$ or more.

Evaluation Example 2: Charging and Discharging Test

Evaluation Example 2-1: (Initial) Discharge Capacity

Initial discharge capacities of the all-solid secondary batteries prepared according to Example 14 and Comparative Example 3 were measured. A cut-off potential was set to 2.0 V to 4.0 V (vs. Li/Li$^+$) and 0.1 C (1C=1.9 mA/cm$^2$) was applied as a constant current. A C rate means a current which will discharge a battery in one hour, e.g., a C rate for a battery having a discharge capacity of 1.6 ampere-hours would be 1.6 amperes.

Figure 7:
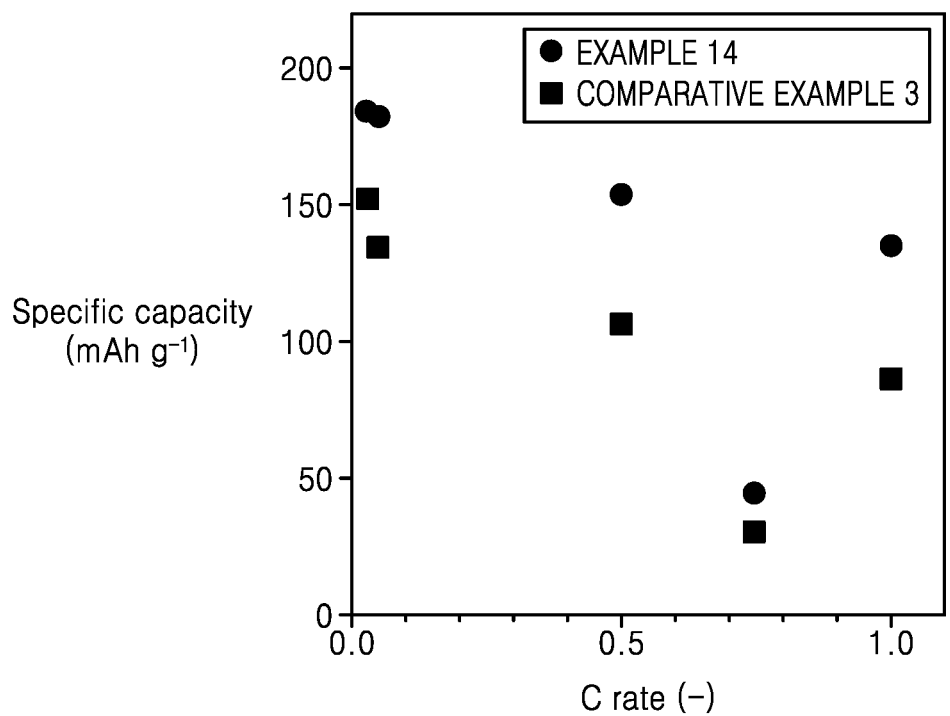
FIG. 7 is a graph of specific capacity (milliampere-hours per gram, mAh g$^{-1}$) versus C rate and shows evaluation results of initial discharge capacities of all-solid secondary batteries prepared according to Example 14 and Comparative Example 3 when the batteries are charged with a constant current of 0.1 C to 4.0 volts and discharged with a constant current of 0.01 C to 1.0 C to a cut-off voltage of 2.0 volts.

During discharging, currents of 0.01 C, 0.05 C, 0.5 C, 0.75 C, and 1.0 C were applied in a constant current (CC) mode. The results are shown in FIG. 7. Also, results of discharging with a rate of 0.05 C in the constant current mode are shown in FIGS. 8 and 9.

As shown in FIG. 7, the all-solid secondary battery prepared according to Example 14 had a higher initial discharge capacity than that of the all-solid secondary battery prepared according to Comparative Example 3.

Figure 8:
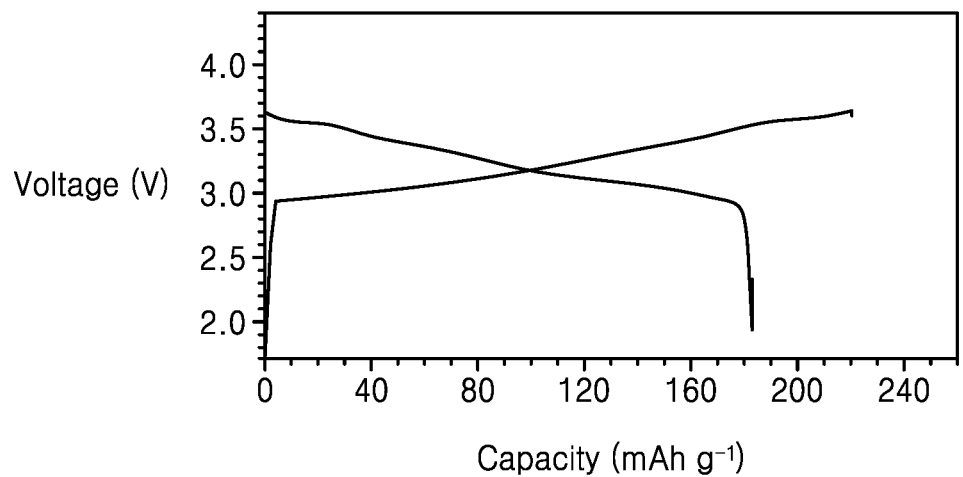
FIGS. 8 and 9 are graphs of voltage (volts, v) versus capacity (milliampere-hours per gram, mAh g$^{-1}$) and show evaluation results of charging and discharging all-solid secondary batteries prepared according to Example 14 and Comparative Example 3 when the batteries are charged with a constant current of 0.1 C to 4 volts and discharged with a constant current of 0.05 C to a cut-off voltage of 2.0 volts, respectively.
Figure 9:
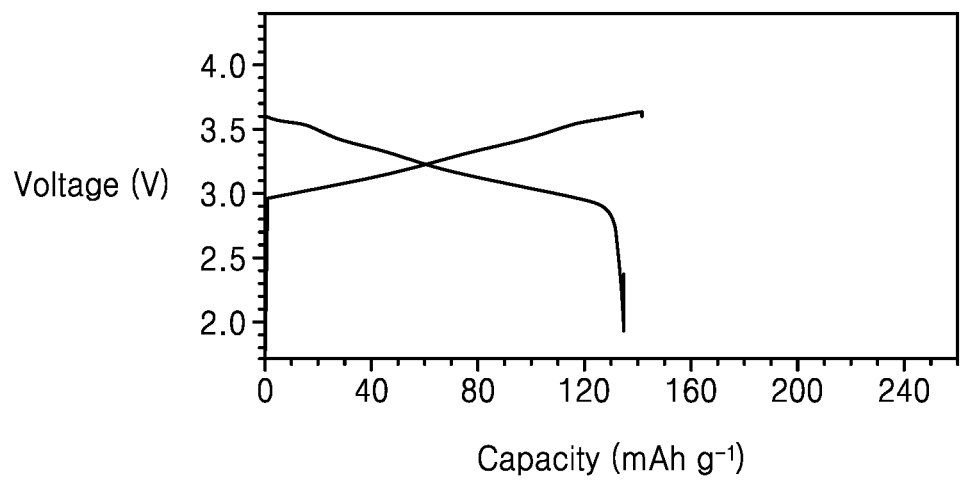

As shown in FIG. 8, the all-solid secondary battery prepared according to Example 14 exhibited a discharge capacity of 175 mAh/g or greater when the current was 0.05 C during discharging. As shown in FIG. 9, the all-solid secondary battery prepared according to Comparative Example 3 exhibited a discharge capacity of 135 mAh/g or less under the same current conditions during discharging.

Evaluation Example 2-2: Lifespan Characteristics

Lifespan characteristics of all-solid secondary batteries prepared according to Example 25 and Comparative Example 5 were evaluated. The lifespan characteristics were evaluated by a charging and discharging test as described below.

Figure 10:
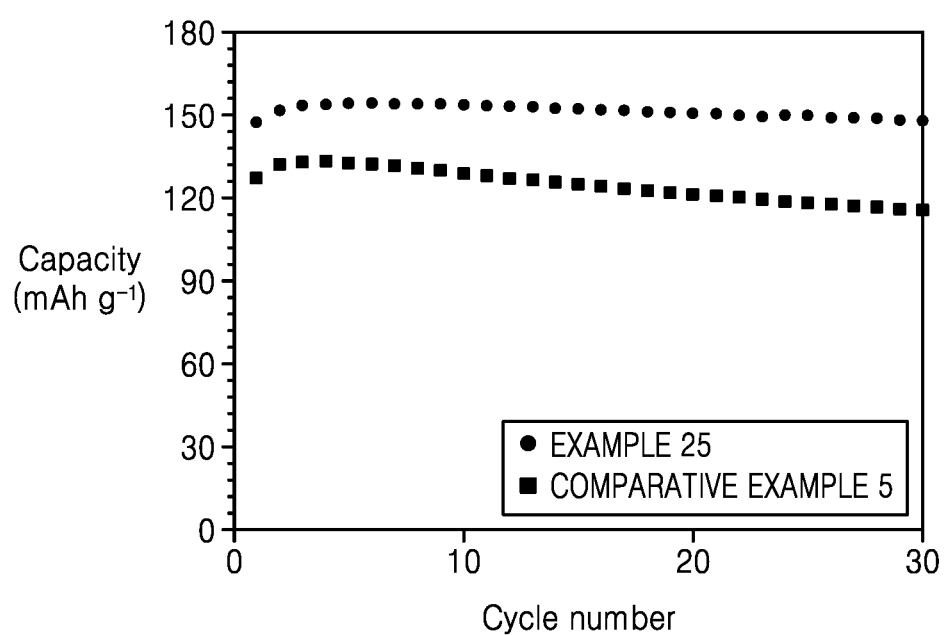
FIG. 10 is a graph of capacity (milliampere hours per gram) versus cycle number and shows evaluation results of lifespan characteristics of all-solid secondary batteries prepared according to Example 25 and Comparative Example 5.

A process of charging with a constant current of 0.1 C until a voltage of the battery reached 4.0 V and discharging with a constant current of 0.1 C until the voltage reached 2.0 V was performed as one cycle. The cycle was repeated, and the results thereof are shown in FIG. 10. Capacity retention ratios are calculated using Equation 2 below and shown in Table 3 below.

Capacity retention (%)=[discharge capacity at 30$^{th}$ cycle/discharge capacity at 1$^{st}$ cycle]×100%   Equation 2

TABLE 3

| | Capacity retention (%) |
|---|---|
| Example 25 | 99.5% |
| Comparative Example 5 | 99.3% |

As shown in Table 3, the all-solid secondary battery prepared according to Example 25 had a higher capacity retention than that of the all-solid secondary battery prepared according to Comparative Example 5.

As shown in FIG. 10, the all-solid secondary battery prepared according to Example 25 stably operated with a discharge capacity higher than 149 mAh/g until the 30$^{th}$ cycle. Upon comparison therewith, although the all-solid secondary battery prepared according to Comparative Example 5 also stably operated until the 30$^{th}$ cycle, a discharge capacity thereof was below 120 mAh/g.

The solid ion conductor according to an embodiment is a halide-based solid ion conductor in which a Li site and/or an In site are substituted with a metal having an oxidation state of +1 and/or a metal having an oxidation state of +3. The solid ion conductor may have increased ionic conductivity. When the solid ion conductor is used in an electrochemical device, the electrochemical device may have excellent electrochemical stability in a wide voltage window and improved charging and discharging characteristics.

The solid ion conductor may be included in a solid electrolyte layer, a positive electrode layer, a negative electrode layer, a protective film on the positive electrode layer, or a protective film on the negative electrode layer of an electrochemical device, for example, an all-solid secondary battery or a metal air battery.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A solid ion conductor comprising a compound represented by Formula 1:

$$Li_aM_bIn_cX_d \quad \text{Formula 1}$$

wherein in Formula 1,
M is at least one of a metal having an oxidation state of +1, or a metal having an oxidation state of +3, and M is at least one of Na, K, Rb, Cs, Ag, Au, Cu, Hg, Tl, Ga, Sc, La, Lu, or Gd,
X is at least one halogen,
2.5<a<3.5, 0<b<0.5, 0.5<c<1.5, and 5<d<7.

2. A solid ion conductor comprising a compound represented by Formula 2:

$$Li_{x-y}(M1)_yIn_{1-z}(M2)_zX'_w \quad \text{Formula 2}$$

wherein in Formula 2,
M1 is a metal having an oxidation state of +1 and an ionic radius of 76 picometers or more,
M2 is a metal having an oxidation state of +3,
X' is at least one halogen,
3<x<4, 0<y<0.5, 0<z<0.5, 5<w<7, and 2.5<x-y<3.5.

3. The solid ion conductor of claim 1, wherein the compound has a distorted rock-salt type structure.

4. The solid ion conductor of claim 1, wherein the compound has a crystal structure having an x-axis, a y-axis, and a z-axis, and the crystal structure comprises a lithium-ion migration channel extending in the x-axis direction, the y-axis direction, and the z-axis direction.

5. The solid ion conductor of claim 1, wherein the compound comprises a crystal structure belonging to a C2/m space group or a C2/m-like space group.

6. The solid ion conductor of claim 1, wherein the compound has a peak at a diffraction angle of 51.5°2θ to 52.0°2θ that is shifted to a smaller angle than a corresponding peak of $Li_3InCl_6$, when analyzed by X-ray diffraction using CuKα radiation.

7. The solid ion conductor of claim 1, wherein M is at least one of Na, K, or Ga.

8. The solid ion conductor of claim 1, wherein X is at least one of Cl, Br, or I.

9. The solid ion conductor of claim 1, wherein in Formula 1, 0<b≤0.3.

10. The solid ion conductor of claim 1, wherein in Formula 1, 0.7<c<1.2.

11. The solid ion conductor of claim 1, wherein the compound comprises at least one of $Li_{3-p}K_pInCl_6$, $Li_{3-p}Cu_pInCl_6$, $Li_{3-p}Na_pInCl_6$, $Li_{3-p}Rb_pInCl_6$, $Li_{3-p}Cs_pInCl_6$, $Li_{3-p}Ag_pInCl_6$, $Li_{3-p}Hg_pInCl_6$, $Li_{3-p}Tl_pInCl_6$, $Li_{3-p}K_pInCl_5Br$, $Li_{3-p}Cu_pInCl_5Br$, $Li_{3-p}Na_pInCl_5Br$, $Li_{3-p}Rb_pInCl_5Br$, $Li_{3-p}Cs_pInCl_5Br$, $Li_{3-p}Ag_pInCl_5Br$, $Li_{3-p}Hg_pInCl_5Br$, $Li_{3-p}Tl_pInCl_5Br$, $Li_{3-p}K_pInClBr_5$, $Li_{3-p}Cu_pInClBr_5$, $Li_{3-p}Na_pInClBr_5$, $Li_{3-p}Rb_pInClBr_5$, $Li_{3-p}Cs_pInClBr_5$, $Li_{3-p}Ag_pInClBr_5$, $Li_{3-p}Hg_pInClBr_5$, $Li_{3-p}Tl_pInClBr_5$, $Li_{3-p}K_pIn_{1-q}Ga_qCl_6$, $Li_{3-p}Cu_pIn_{1-q}Ga_qCl_6$, $Li_{3-p}Na_pIn_{1-q}Ga_qCl_6$, $Li_{3-p}Rb_pIn_{1-q}Ga_qCl_6$, $Li_{3-p}Cs_pIn_{1-q}Ga_qCl_6$, $Li_{3-p}Ag_pIn_{1-q}Ga_qCl_6$, $Li_{3-p}Hg_pIn_{1-q}Ga_qCl_6$, $Li_{3-p}Tl_pIn_{1-q}Ga_qCl_6$, $Li_{3-p}K_pIn_{1-q}Ga_qCl_5Br$, $Li_{3-p}Cu_pIn_{1-q}Ga_qCl_5Br$, $Li_{3-p}Na_pIn_{1-q}Ga_qCl_5Br$, $Li_{3-p}Rb_pIn_{1-q}Ga_qCl_5Br$, $Li_{3-p}Cs_pIn_{1-q}Ga_qCl_5Br$, $Li_{3-p}Ag_pIn_{1-q}Ga_qCl_5Br$, $Li_{3-p}Hg_pIn_{1-q}Ga_qCl_5Br$, $Li_{3-p}Tl_pIn_{1-q}Ga_qCl_5Br$, $Li_{3-p}K_pIn_{1-q}Ga_qClBr_5$, $Li_{3-p}Cu_pIn_{1-q}Ga_qClBr_5$, $Li_{3-p}Na_pIn_{1-q}Ga_qClBr_5$, $Li_{3-p}Rb_pIn_{1-q}Ga_qClBr_5$, $Li_{3-p}Cs_pIn_{1-q}Ga_qClBr_5$, $Li_{3-p}Ag_pIn_{1-q}Ga_qClBr_5$, $Li_{3-p}Hg_pIn_{1-q}Ga_qClBr_5$, or $Li_{3-p}Tl_pIn_{1-q}Ga_qClBr_5$, wherein each occurrence of p is independently greater than 0 and less than or equal to 0.3, and each occurrence of q is independently greater than 0 and less than or equal to 0.3.

12. The solid ion conductor of claim 1, wherein the solid ion conductor has an ionic conductivity of 3.5×10$^{-4}$ milli-siemens per centimeter or greater at 25° C.

13. A solid electrolyte comprising:
the solid ion conductor of claim 1, and
optionally at least one of an oxide solid electrolyte, or a sulfide solid electrolyte.

14. The solid electrolyte of claim 13, wherein the solid electrolyte is electrochemically stable between 0.6 volt and 4.2 volts versus Li/Li$^+$.

15. An electrochemical device comprising:
a positive electrode layer;
a negative electrode layer; and
a solid electrolyte layer disposed between the positive electrode layer and the negative electrode layer,
wherein at least one of the positive electrode layer, the negative electrode layer, or the solid electrolyte layer comprises the solid electrolyte of claim 14.

16. The electrochemical device of claim 15, further comprising a protective film, wherein the protective film is on at least one of the positive electrode layer or the negative electrode layer, and the protective film comprises the solid electrolyte.

17. The electrochemical device of claim 15, wherein the solid electrolyte layer comprises the solid ion conductor.

18. The electrochemical device of claim 17, wherein solid electrolyte layer further comprises the sulfide solid electrolyte, and wherein the sulfide solid electrolyte comprises a solid electrolyte represented by Formula 3:

$$Li^+{}_{12-n-r}A^{n+}Q^{2-}{}_{6-r}Y'^-{}_r \quad \text{Formula 3}$$

wherein in Formula 3,
A is P, As, Ge, Ga, Sb, Si, Sn, Al, In, Tl, V, Nb, or Ta,
Q is at least one of S, Se, or Te,
Y' is at least one of Cl, Br, I, F, CN, OCN, SCN, or $N_3$,
1<n<5 and 0<r<2.

19. The electrochemical device of claim 15, wherein the solid electrolyte layer has a thickness of about 10 micrometers to about 1 millimeter.

20. The electrochemical device of claim 15, wherein the positive electrode layer comprises:
a positive active material comprising at least one of a lithium transition metal oxide, a lithium transition metal phosphate, or a sulfide; and the solid ion conductor.

21. The electrochemical device of claim 20, wherein the solid ion conductor comprises a lithium-ion transfer path comprising a metal ion having an oxidation state of +1.

22. The electrochemical device of claim 21, wherein the metal ion is inserted into the lithium-ion transfer path during charge and discharge of the positive active material.

23. The electrochemical device of claim 15, wherein the positive electrode layer further comprises an ion-conductive inorganic material.

24. The electrochemical device of claim 15, wherein the negative electrode layer comprises at least one of a metallic negative active material, or a carbonaceous negative active material.

25. The electrochemical device of claim 15, wherein the electrochemical device is an all-solid secondary battery or a metal air battery.

26. A method of preparing a solid ion conductor, the method comprising:
providing a solid ion conductor-forming precursor mixture;
mechanically milling the solid ion conductor-forming precursor mixture; and
heat-treating the solid ion conductor-forming precursor mixture at a temperature above 40° C. and below 300° C. to prepare the solid ion conductor $$Li_aM_bIn_cX_d \quad \text{Formula 1}$$

wherein in Formula 1,
M is at least one of a metal having an oxidation state of +1, or a metal having an oxidation state of +3, and M is at least one of Na, K, Rb, Cs, Ag, Au, Cu, Hg, Tl, Ga, Sc, La, Lu, or Gd,
X is at least one halogen,
2.5<a<3.5, 0<b<0.5, 0.5<c<1.5, and 5<d<7.

27. The method of claim 26, wherein the mechanical milling comprises at least one of ball-milling, airjet-milling, bead milling, roll-milling, planetary milling, hand milling, high energy ball milling, stirred ball milling, vibrating milling, mechanofusion milling, shaker milling, attritor milling, disk milling, shape milling, nauta milling, nobilta milling, or highspeed mixing.

28. The method of claim 26, wherein the mechanical milling is planetary milling performed at room temperature.

29. The method of claim 26, further comprising molding after the mechanically milling.

30. A protected positive electrode layer, comprising
a positive electrode layer; and
a protective film comprising the solid ion conductor of claim 1 on the positive electrode layer.

31. A protected negative electrode layer, comprising
a negative electrode layer; and
a protective film comprising the solid ion conductor of claim 1 on the negative electrode layer.

* * * * *